US010993128B2

(12) United States Patent
Wei et al.

(10) Patent No.: US 10,993,128 B2
(45) Date of Patent: Apr. 27, 2021

(54) EVOLVED BUFFER STATUS REPORT SUPPORTING MULTIPLE NUMEROLOGY FACTORS

(71) Applicant: FG Innovation Company Limited, Tuen Mun (HK)

(72) Inventors: Chia-Hung Wei, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 296 days.

(21) Appl. No.: 16/008,356

(22) Filed: Jun. 14, 2018

(65) Prior Publication Data

US 2018/0368012 A1    Dec. 20, 2018

Related U.S. Application Data

(60) Provisional application No. 62/519,392, filed on Jun. 14, 2017.

(51) Int. Cl.
*H04W 24/08*    (2009.01)
*H04W 72/12*    (2009.01)
(Continued)

(52) U.S. Cl.
CPC ......... *H04W 24/08* (2013.01); *H04W 72/042* (2013.01); *H04W 72/1278* (2013.01); *H04W 74/08* (2013.01); *H04W 88/02* (2013.01)

(58) Field of Classification Search
CPC .............. H04W 24/08; H04W 72/042; H04W 72/1278; H04W 74/08; H04W 88/02
See application file for complete search history.

(56) References Cited

U.S. PATENT DOCUMENTS

2012/0033569 A1*   2/2012   Tesanovic .......... H04W 28/0278
                                                       370/252
2015/0215953 A1*   7/2015   Wang ................ H04W 28/0263
                                                       370/230
(Continued)

FOREIGN PATENT DOCUMENTS

CN        106535246 A    3/2017
WO       2013009635 A2   1/2013

OTHER PUBLICATIONS

Ericsson Uplink dynamic scheduling in NR, 3GPP TSG-RAN WG2 #97 Tdoc R2-1700838, Feb. 17, 2017 (Feb. 17, 2017) section 2.2.2.

*Primary Examiner* — Christopher M Crutchfield
*Assistant Examiner* — Tito Q Pham
(74) *Attorney, Agent, or Firm* — ScienBiziP, P.C.

(57) ABSTRACT

A user equipment (UE) includes one or more non-transitory computer-readable media having computer-executable instructions embodied thereon, at least one processor coupled to the one or more non-transitory computer-readable media, and configured to execute the computer-executable instructions to receive a logical channel group (LCG) list having a plurality of logical channels in one or more LCGs, where grouping of the plurality of logical channels is based at least in part on a mapping policy between each of the plurality of logical channels and one or more numerology factors. The at least one processor is further configured to execute the computer-executable instructions to request for a numerology-specific uplink radio resource for one of the one or more LCGs through a buffer status report (BSR), wherein the BSR includes a LCG ID identifying the one of the one or more LCGs.

10 Claims, 27 Drawing Sheets

(51) Int. Cl.
    *H04W 72/04*     (2009.01)
    *H04W 74/08*     (2009.01)
    *H04W 88/02*     (2009.01)

(56) References Cited

U.S. PATENT DOCUMENTS

| | | | |
|---|---|---|---|
| 2016/0100397 A1* | 4/2016 | Wen | H04W 24/10 |
| | | | 370/329 |
| 2017/0099615 A1* | 4/2017 | Tesanovic | H04L 43/0817 |
| 2017/0208610 A1* | 7/2017 | Tang | H04W 72/1205 |
| 2017/0215160 A1* | 7/2017 | Lohr | H04L 5/0053 |
| 2018/0077718 A1* | 3/2018 | Nory | H04W 72/0413 |
| 2018/0084542 A1* | 3/2018 | Fujishiro | H04W 52/146 |
| 2018/0124829 A1* | 5/2018 | Lee | H04W 72/1205 |
| 2018/0145795 A1* | 5/2018 | Yi | H04L 1/1819 |
| 2018/0206290 A1* | 7/2018 | Dai | H04W 52/50 |
| 2018/0255559 A1* | 9/2018 | Lee | H04W 76/23 |
| 2018/0270854 A1* | 9/2018 | Lee | H04L 1/1896 |
| 2019/0182639 A1* | 6/2019 | Basu Mallick | H04W 8/24 |
| 2020/0163109 A1* | 5/2020 | Zhang | H04W 72/14 |

\* cited by examiner

FIG. 3A

```
LogicalChannelConfig ::=    SEQUENCE {
    ul-SpecificParameters     SEQUENCE {
    DefaultNumerology SEQUENCE {
        NSSN                  sequence {....}
        SubcarrierSpacing     ENUMERATED {
                              3.75K, 15K, ..., spare1, spare 2} OPTIONAL,
        CyclicPrefix          ENUMERATED {
                              Symbol1, Symbol2, ..., spare1, spare 2},
OPTIONAL,
        TransmissionTimeIntervalLength   ENUMERATED {
                              Symbol1, Symbol2, ..., spare1, spare 2},
    ...
    }
    Numerology SEQUENCE {
    ...
    }
}}
```

```
LogicalChannelConfig ::=         SEQUENCE {
    ul-SpecificParameters        SEQUENCE {
        DefaultNumerology SEQUENCE {
            NSSN                 sequence {....}
        }
        Numerology SEQUENCE {
            NSSN                 sequence {....}
        }
        ...
    }
}
```

300B

Long BSR Control Element 400B
with
Default Numerology Indicators
(Type I)

Long BSR Control Element 400C
with
Default Numerology Indicators
(Type II)

LCH BSR Control Element 800A
with
Multiple NSSNs and Multiple 2-bit RNs

LCH BSR Control Element 800B
with
Multiple NSSNs and Multiple 3-bit RNs

LCH BSR Control Element 900A
with
Three NSSNs and Three 2-bit RNs

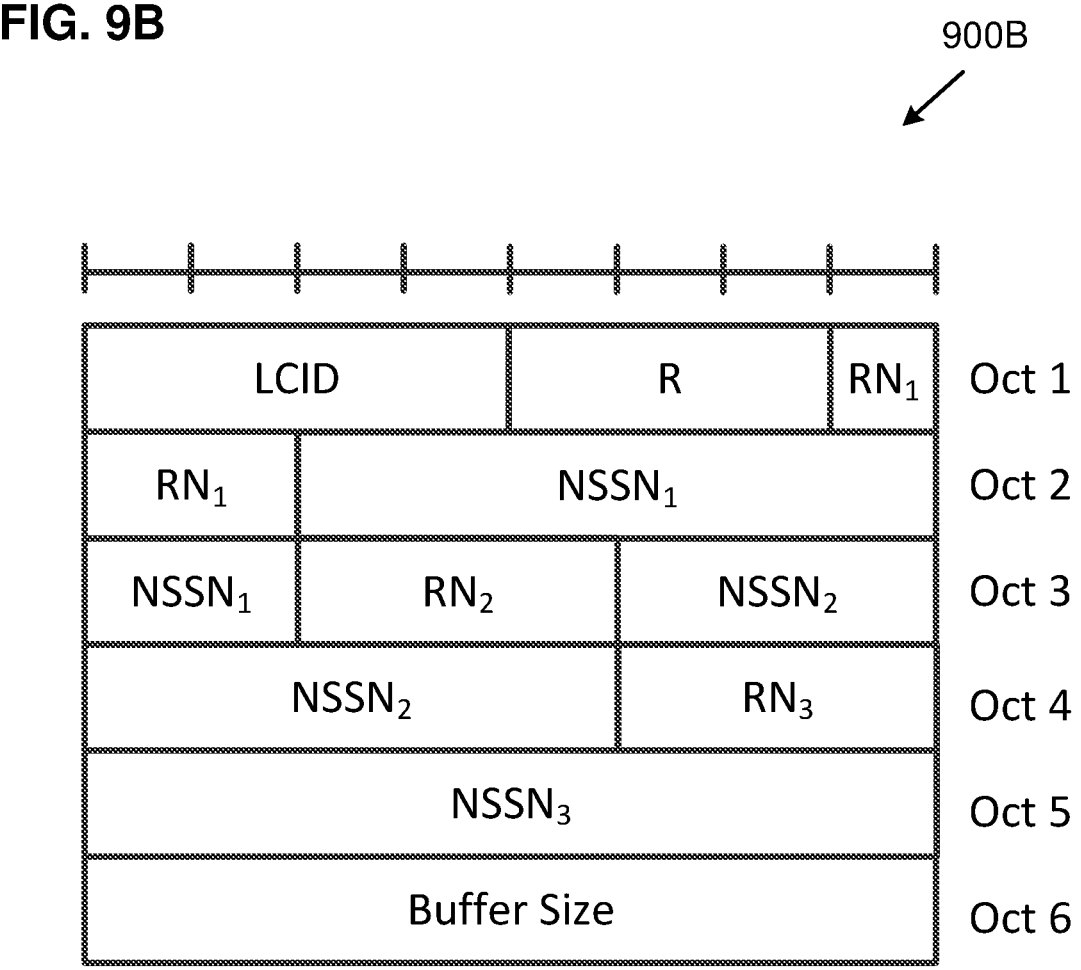
LCH BSR Control Element 900B
with
Three NSSNs and Three 3-bit RNs

EVOLVED BUFFER STATUS REPORT SUPPORTING MULTIPLE NUMEROLOGY FACTORS

CROSS-REFERENCE TO RELATED APPLICATION(S)

The present application claims the benefit of and priority to a provisional U.S. Patent Application Ser. No. 62/519,392 filed Jun. 14, 2017, entitled "EVOLVED BUFFER STATUS REPORT SUPPORTING MULTIPLE NUMEROLOGY FACTORS," (hereinafter referred to as "US70921 application"). The disclosure of the US70921 application is hereby incorporated fully by reference into the present application.

FIELD

The present disclosure generally relates to wireless communication methods, and more particularly, to evolved buffer status report (BSR) that supports multiple numerology factors.

BACKGROUND

In fourth generation (4G) wireless communication systems (e.g., long term evolution (LTE), evolved LTE (eLTE), or LTE-Advanced (LTE-A)), a base station (e.g., evolved Node B (eNB)) can allocate orthogonal resources (e.g., time and frequency) to user equipment's (UEs) under its coverage, so that the UEs can share the radio resource (e.g., uplink/downlink) simultaneously. That is, the radio resource allocated by the base station to a specific UE cannot be used by other UEs. When a UE has uplink data that needs to be transmitted, the UE needs to request an allocation of uplink radio resource from the base station. The uplink radio resource requesting procedure is referred to as a buffer status report (BSR). For example, the BSR is transmitted from the UE to the base station, and contains information on the amount of data in each logical channel group that is ready for uplink transmission in the UE's buffers.

In the next generation (e.g., 5G) wireless communication networks, also referred to as New Radio (NR), a logical channel may be mapped to different numerologies (e.g., multiple TTIs and/or sub-carrier spacings and/or cyclic prefix). In order to support diverse use cases, (e.g., enhanced mobile broadband (eMBB), massive machine type communications (mMTC), and ultra-reliable low latency communications (URLLC)), which have a greater variety of quality of service (QoS) requirements than the 4G wireless networks, the physical layer of a UE in NR wireless networks needs to be more flexible to support multiple numerologies.

A numerology with a shorter TTI length would be more helpful in reducing latency as compared to a numerology with a longer TTI length. However, a numerology with a longer TTI length could be useful for resource efficiency aspects for other use cases.

For example, URLLC with ultra-low latency requirements may benefit from transmitting data with short TTIs, while eMBB communications may focus on achieving high throughputs and not so stringent on short TTI requirements. Since the UE may perform several applications simultaneously in an NR network, with each application generating data for transmission with different QoS requirements and different TTIs, it is desirable for a single MAC layer to support one or more numerologies, and a radio bearer/ logical channel that can be mapped to multiple numerologies (e.g., TTI durations).

Since a logical channel can be mapped to multiple numerologies in NR, the BSR by a UE can provide more precise information in the radio resource allocation request. Moreover, the conventional BSR and related behaviors (e.g., BSR retransmission, periodic BSR reporting and scheduling request (SR) triggering) in the legacy LTE systems need to be modified to support multiple numerology factors.

Hence, it is desirable for the radio resource allocation procedure, for example, performed by the base station to take into account of the UE's specific needs or demands when allocating radio resource to the UE in order to improve the overall efficiency of the radio resource utilization.

In addition, in the current LTE system, the buffer status is reporting on a logical channel group (LCG) basis, which accumulates resource requests from all of the logical channels (LCHs) belonging to the LCG. However, since the numerology mapping for each LCH can be different, it is desirable to have a new BSR format for reporting buffer status on a LCH basis in order to have more precise reporting.

SUMMARY

The present disclosure is directed to evolved buffer status report supporting multiple numerology factors.

BRIEF DESCRIPTION OF THE DRAWINGS

FIG. 3A is an example of a numerology configuration with a UE-specific NSSN assignment, according to an exemplary implementation of the present application.

FIG. 3B is an example of a numerology configuration with a Cell-specific assignment, or an NSSN assignment having identical/uniform NSSN throughout an entire NR wireless network system, according to an exemplary implementation of the present application.

FIG. 9B is a diagram illustrating a LCH BSR CE with three NSSNs and three 3-bit ratios of numerology, according to an exemplary implementation of the present application.

DETAILED DESCRIPTION

Figure 1A:
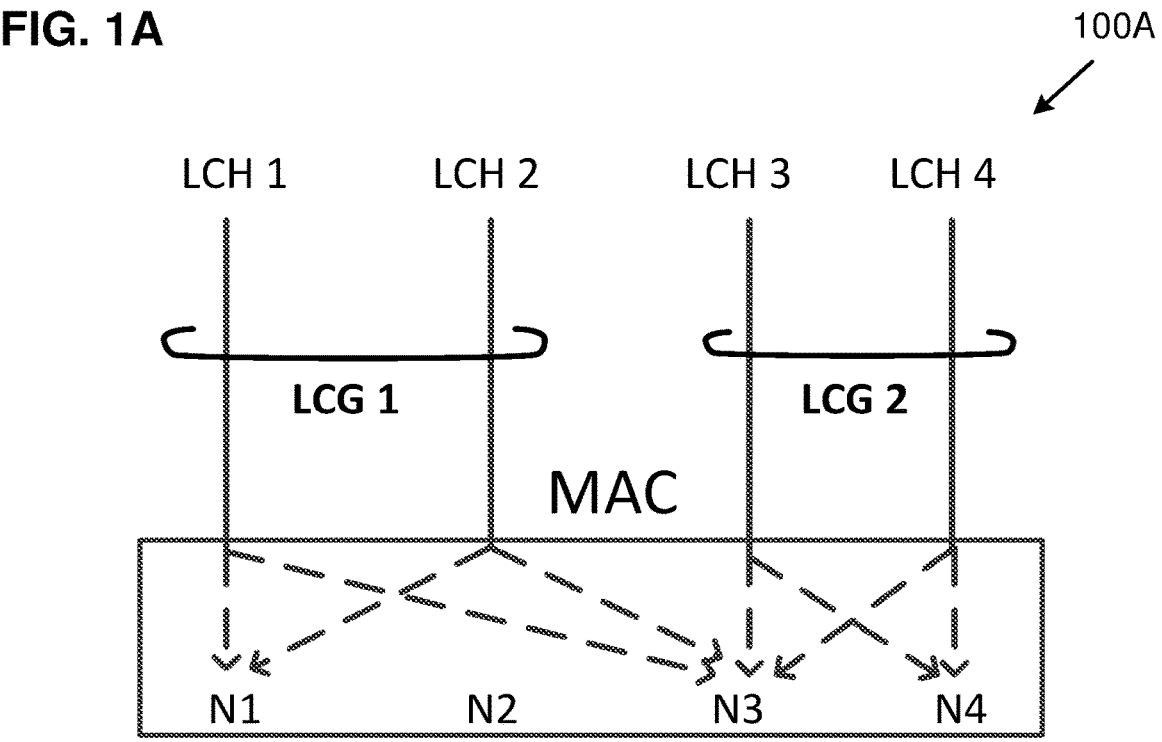
FIG. 1A is a diagram illustrating a grouping policy, according to an exemplary implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A)

system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink and optionally uplink resources to at least one UE within the cell's radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as eMBB, mMTC, and URLLC, while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

Exemplary implementations of the present application relate to evolved BSR mechanisms which can be applied when multiple numerologies are supported and a LCH is configured with multiple numerologies, each having multiple numerology factors. The evolved BSR mechanisms may include logical channel grouping, BSR transmission, BSR retransmission, and scheduling request. Examples of numerology factors may include, but are not limited to, TTI length, subcarrier spacing (SCS), and of cyclic prefix (CP) length. It should be noted that the BSR transmission/retransmission and SR procedures can be logically extended to implementations in which a logical channel is configured with other numerology factor(s).

Case 1: Logical Channel Grouping

In one exemplary implementation of the present application, a UE may report its buffer status on a logical channel group (LCG) basis. A base station (e.g., a next generation Node B (gNB)) may group the UE's logical channels into several LCGs, and transmit a LCG list to the UE, for example, through a downlink RRC message (e.g., RRCReconfiguration message). The LCG list may include a list of LCHs belonging to each LCG. In contrast to conventional BSR procedures, the grouping policy for the evolved BSR mechanism allows the base station (e.g., gNB) to consider the mapping between numerologies and logical channels. Since the numerologies mapped by each logical channel can be different, exemplary implementations of the present application present three grouping policies as follows.

Case 1.1: Grouping Policies

Figure 1B:
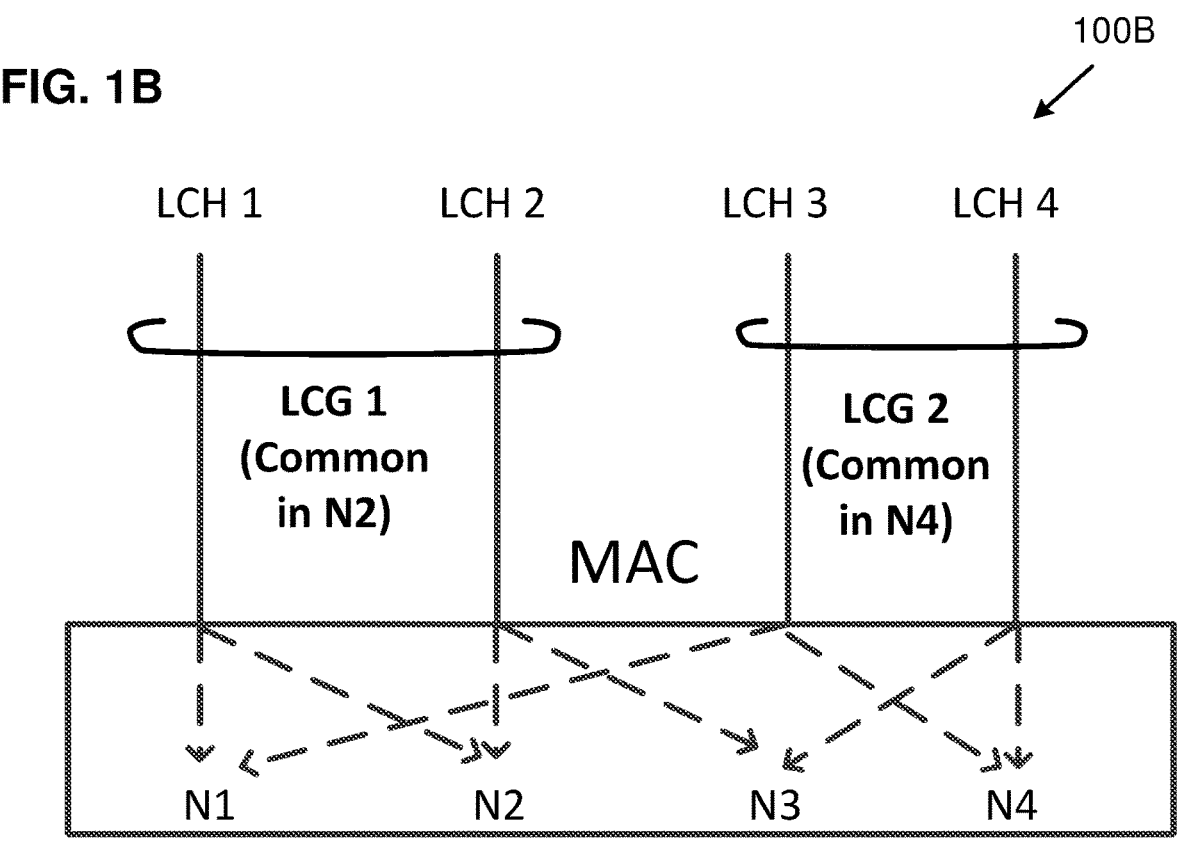
FIG. 1B is a diagram illustrating another grouping policy, according to an exemplary implementation of the present application.

As shown in FIGS. 1A and 1B, a base station (e.g., gNB) may group the logical channels of a UE based on the numerologies to which the logical channels each map. In FIG. 1A, in grouping policy 100A, LCH 1 and LCH 2 both map to numerologies 1 and 3 (e.g., N1 and N3) in a MAC layer. LCH 3 and LCH 4 both map to numerologies 3 and 4 (e.g., N3 and N4) in the MAC layer. Thus, the base station may group LCH 1 and LCH 2 together in LCG 1 since the numerologies (e.g., N1 and N3) to which LCH 1 and LCH 2 are map are identical. The base station may also group LCH 3 and LCH 4 together in LCG 3 since the numerologies (e.g., N3 and N4) to which LCH 3 and LCH 4 are map are identical.

As shown in FIG. 1B, in grouping policy 100B, LCH 1 maps to N1 and N2. LCH 2 maps to N2 and N3. LCH 3 maps to N1 and N4. LCH 4 maps to N3 and N4. In one implementation, the base station may group LCH 1 and LCH 2 together in LCG 1 since LCH 1 and LCH 2 both map to N2, although LCH 1 and LCH 2 also map to N1 and N3, respectively. The base station may group LCH 3 and LCH 4 together in LCG 2 since LCH 3 and LCH 4 both map to N4, although LCH 3 and LCH 4 also map to N1 and N3, respectively. In another implementation, the base station may group LCH 1 and LCH 3 together in one LCG since they both map to N1, and group LCH 2 and LCH 4 together in another LCG since they both map to N3. It is noted that in FIGS. 1A and 1B, the base station performs grouping based on the numerologies mapped to by each logical channel.

Figure 1C:
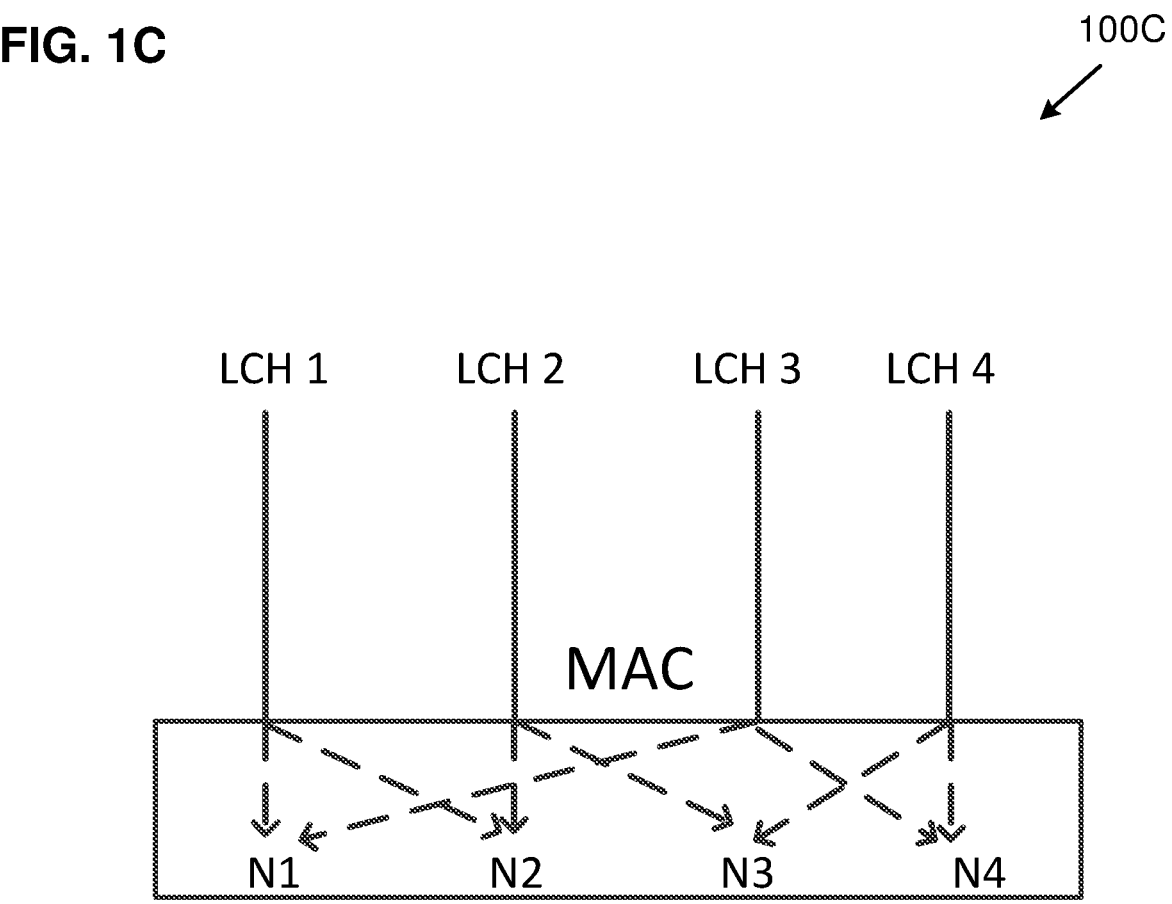
FIG. 1C is a diagram illustrating another grouping policy, according to an exemplary implementation of the present application.

As shown in FIG. 1C, in grouping policy 100C, a base station (e.g., gNB) may group the logical channels from the perspective of the numerologies. That is, each numerology may have its own LCG. For example, for each numerology, all of the logical channels that map to the numerology are grouped to a LCG. As shown in FIG. 1C, LCH 1 maps to N1 and N2. LCH 2 maps to N2 and N3. LCH 3 maps to N1 and N4. LCH 4 maps to N3 and N4. The base station may group LCH 1 and LCH 3 together in LCG 1 since they both map to N1. The base station may group LCH 1 and LCH 2 together in LCG 2 since they both map to N2. The base station may group LCH 2 and LCH 4 together in LCG 3 since they both map to N3. The base station may group LCH 3 and LCH 4 together in LCG 4 since they both map to N4. It is noted that in FIG. 1C, a logical channel may belong to more than one LCG, if the logical channel is mapped to more than one numerology. Thus, the BSR for each LCG is counting based on the amount of data that needs to be transmitted on the corresponding numerology. It is noted that in FIG. 1C, the base station performs grouping from each numerology's perspective.

It should be noted that the multiple grouping policies shown in FIGS. 1A-1C can be applied to a UE simultaneously. Moreover, in FIGS. 1A and 1B, a default numerology within each LCG can also be determined and set, since not every numerology's radio resource (e.g., uplink radio resource) and configuration for the LCG is needed all the time. The UE can usually request the default numerology's radio resource (e.g., uplink radio resource) and request radio resource for other numerologies only when needed. Moreover, in order to reduce signaling overhead on numerology indications between the UE and the base station (e.g., gNB), each LCH/LCG can be pre-configured with a default numerology among all the numerologies the LCH/LCG may map to.

Case 1.2: Default Numerology Determination

Figure 2A:
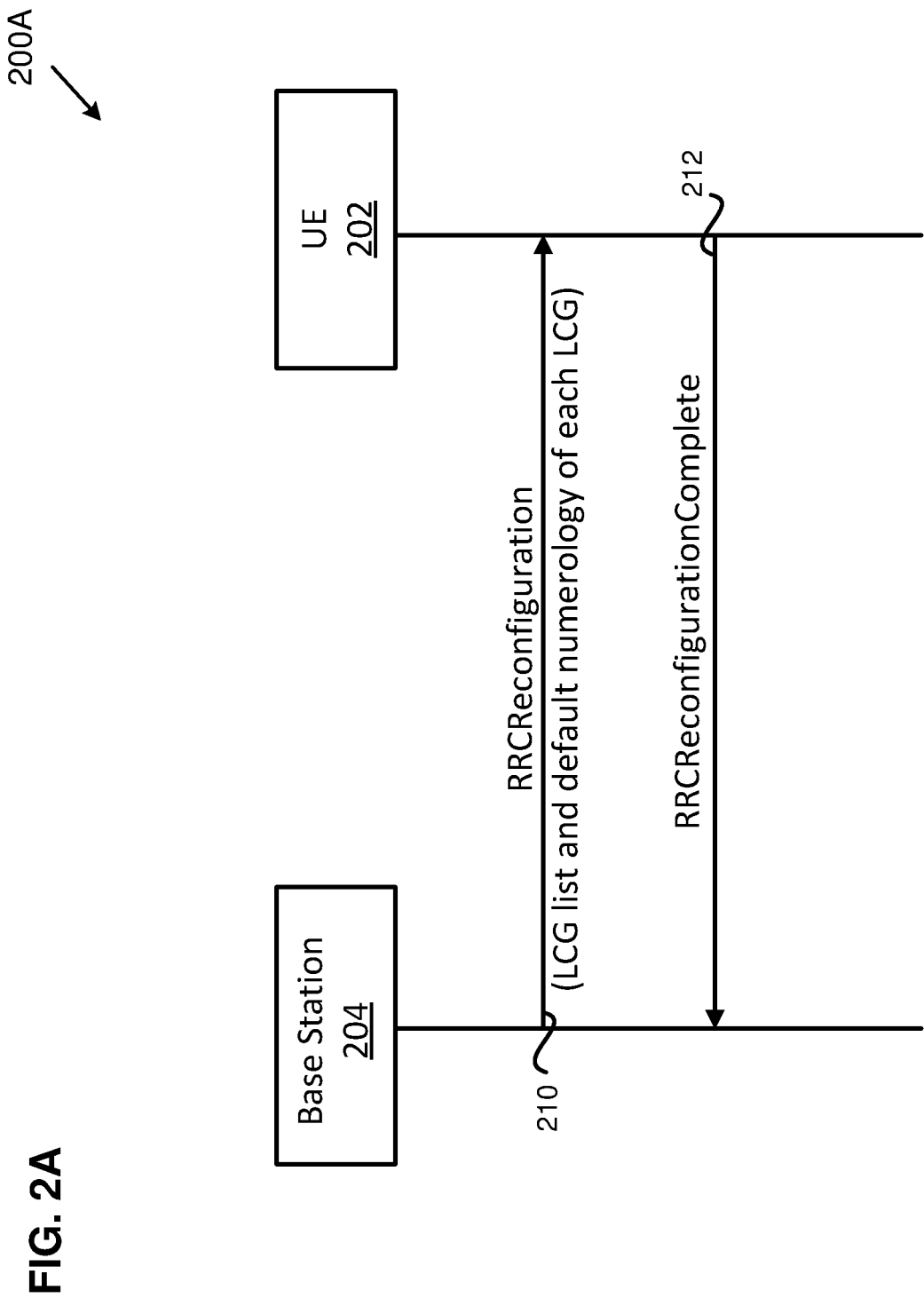
FIG. 2A is a diagram illustrating a default numerology determination method by a gNB, according to an exemplary implementation of the present application.
Figure 2B:
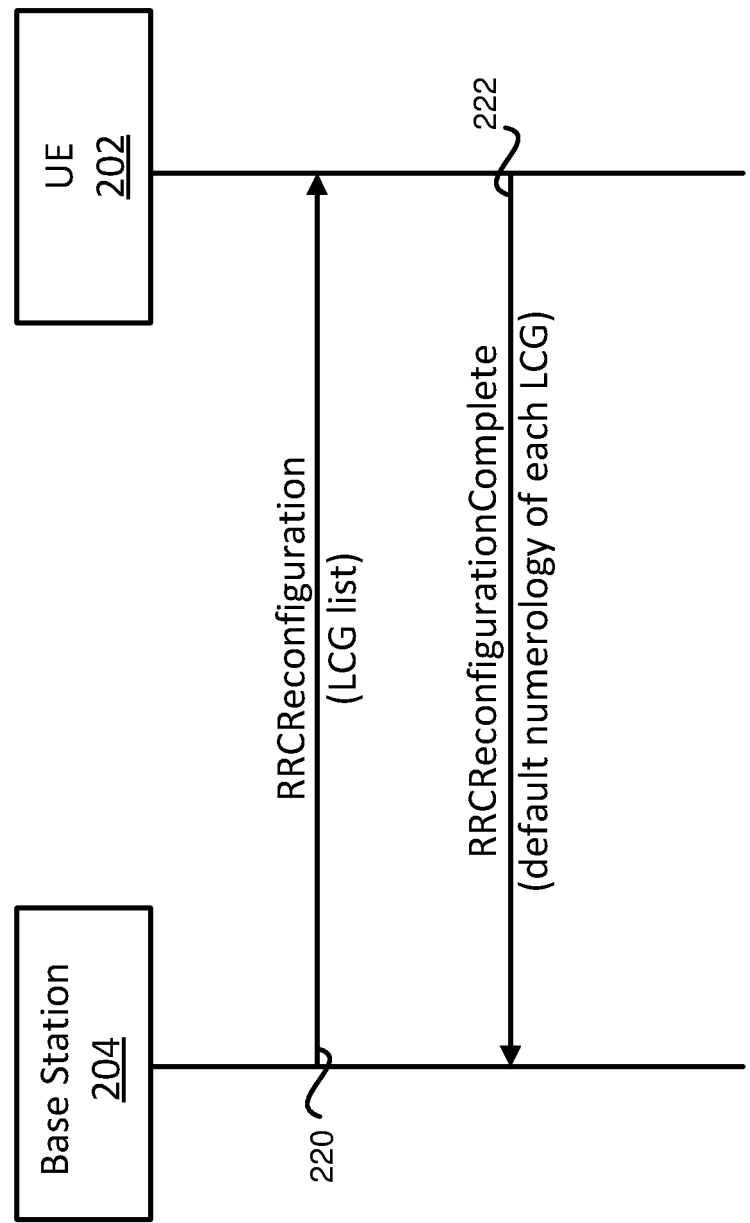
FIG. 2B is a diagram illustrating a default numerology determination method by a UE, according to an exemplary implementation of the present application.
Figure 2C:
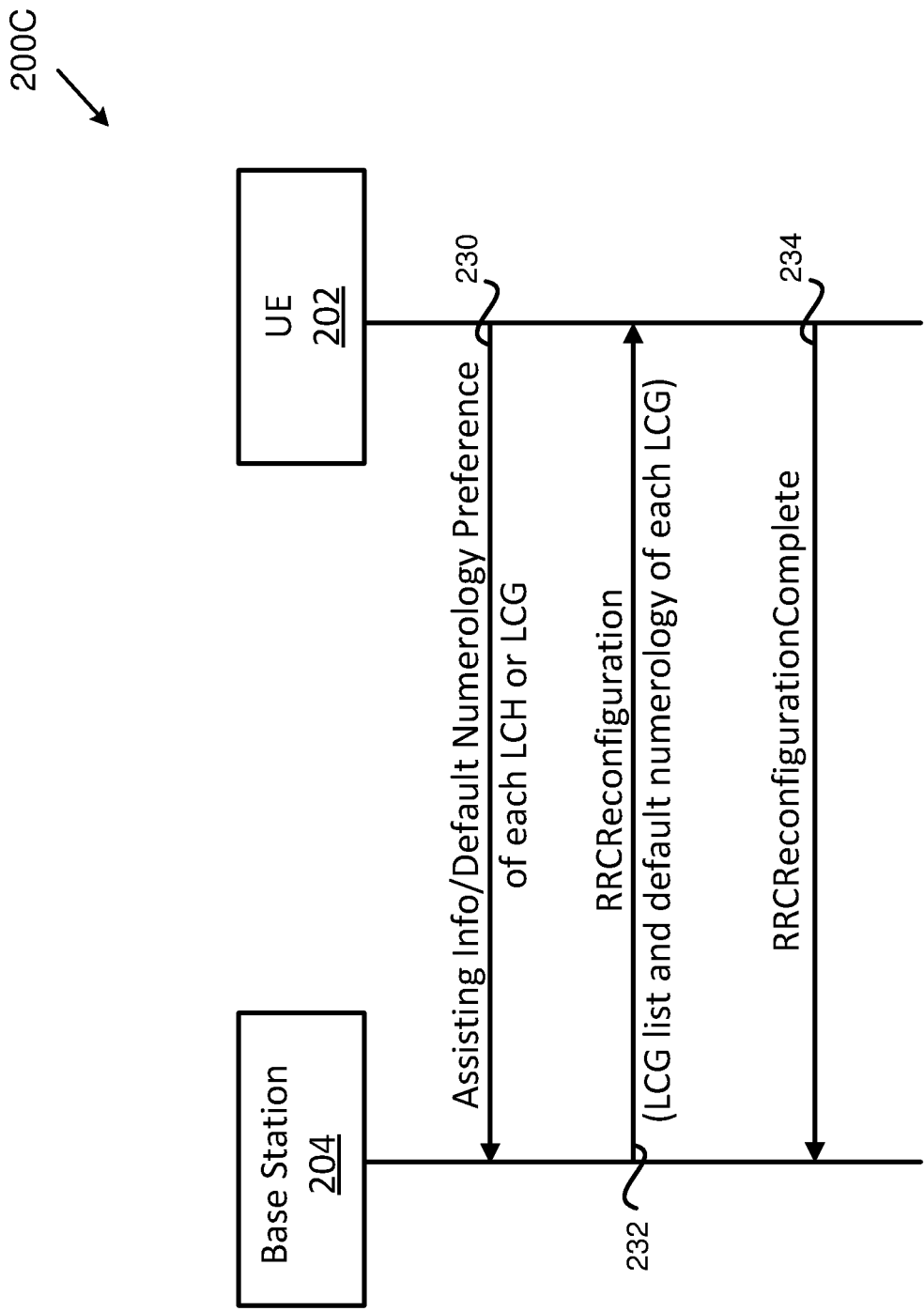
FIG. 2C is a diagram illustrating a coordinated default numerology determination method, according to an exemplary implementation of the present application.

FIGS. 2A, 2B and 2C show three methods for default numerology determination. FIG. 2A is a diagram illustrating a default numerology determination method by a gNB, according to an exemplary implementation of the present application. As shown in FIG. 2A, in method 200A, in action 210, base station 204 (e.g., a gNB) performs grouping of the LCHs to form a LCG list, determines/configures a default numerology for each LCG, and transmits the determination/configuration to UE 202, for example, through a downlink RRC message (e.g., an RRCReconfiguration message). In action 212, UE 202 sends an acknowledgement or a non-acknowledgement, for example, through an uplink RRC message (e.g., an RRCReconfigurationComplete message). Thus, in method 200A, base station 204 determines the default numerology for each LCG.

FIG. 2B is a diagram illustrating a default numerology determination method by a UE, according to an exemplary implementation of the present application. As shown in FIG. 2B, in method 200B, in action 220, base station 204 (e.g., a gNB) performs grouping of the LCHs to form a LCG list, and transmits the LCG list to UE 202, for example, through a downlink RRC message (e.g., an RRCReconfiguration message). In action 222, UE 202 then determines/configures a default numerology for each LCG, and transmits a default numerology of each LCG to base station 204, for example, through an uplink RRC message (e.g., an RRCReconfigurationComplete message). Thus, in method 200B, UE 202 determines the default numerology for each LCG.

FIG. 2C is a diagram illustrating a coordinated default numerology determination method, according to an exemplary implementation of the present application. As shown in FIG. 2C, in method 200C, in action 230, UE 202 provides assisting information or a default numerology preference for each LCH/LCG to base station 204 (e.g., a gNB) to aid base station 204 in making determination of a default numerology for each LCH/LCG. In FIG. 2C, UE 202 provides the assisting information and/or default numerology preference of each LCH or LCG to base station 204. The assisting information may include QoS requirements of each LCH/LCG and traffic pattern. Upon receiving the assisting information and/or default numerology preference from UE 202, in action 232, base station 204 performs grouping of the LCHs to form a LCG list based on one or more grouping policies, determines/configures a default numerology for each LCH/LCG based on the assisting information and/or default numerology preference, and transmits the LCH/LCG list and the default numerology for each LCH/LCG to UE 202, for example, through a downlink RRC message (e.g., an RRCReconfiguration message). In action 234, UE 202 sends an acknowledgement or a non-acknowledgement, for example, through an uplink RRC message (e.g., an RRCReconfigurationComplete message). Thus, in method 200C, UE 202 coordinates with base station 204 to determine the default numerology for each LCG. In method 200C, base station 204 makes the final decisions on which grouping policy(ies) to adopt and the default numerology for each LCG.

Case 1.3: Numerology Configuration

When a base station (e.g., gNB) configures a UE's logical channels, the corresponding numerology configurations for the logical channels can also be provided, for example, through the RRC signaling. For example, the numerology configurations for the logical channels can be transmitted from the base station to the UE through the RRCReconfiguration message, which contains a CellGroupConfig information element. The numerology configuration of each logical channel can be independently configured.

As illustrated in FIGS. 3A and 3B, a base station (e.g., gNB) configures each logical channel with settings on a number of numerology factors, including but not limited to SCS, CP and TTI. It is noted that all of the numerology factors can be optionally contained in the numerology configuration. Other numerology factors (e.g., including numerology factors that may be incorporated into the NR standards in the future) can also be included in the RRC message by adding more parameters. In FIG. 3A, the base station (e.g., gNB) can also indicate which set of numerology factors is used as the default numerology for the LCH and/or the LCG to which the LCH belongs, in the numerology configuration.

Since a logical channel can be mapped to multiple numerologies, the base station can configure multiple sets of numerology factors for each individual logical channel. The base station can also assign a numerology set sequence number (NSSN) to each set of numerology configuration. The NSSN can be transmitted together with downlink control information (DCI) from the base station to the UE to indicate or provide the numerologies of the scheduled uplink radio resource.

The NSSN assignment can be UE-specific, Cell-specific, or identical/uniform throughout an entire NR wireless network system. When the NSSN assignment is UE-specific, the NSSN is only valid within each LCH or LCG toward a specific UE. When the NSSN assignment is Cell-specific, the NSSN is uniquely mapped to a combination of configurations on the numerology factors within a specific cell. When the NSSN assignment is identical/uniform throughout an entire NR wireless network system, the NSSN is uniquely mapped to a combination of configurations on the numerology factors within an entire NR wireless network system.

FIG. 3A is an example of a numerology configuration with a UE-specific NSSN assignment, according to an exemplary implementation of the present application. In diagram 300A, each numerology configuration set has multiple numerology factors and their corresponding settings.

FIG. 3B is an example of a numerology configuration with a Cell-specific assignment, or an NSSN assignment having identical/uniform NSSN throughout an entire NR wireless network system, according to an exemplary implementation of the present application. For example, a base station directly configures each LCH with a NSSN that has a fixed mapping to a combination of configurations on the numerology factors as shown in diagram 300B without the numerology factor(s) setting. The mapping between each NSSN and the corresponding detailed configuration on each numerology factor can be predefined or broadcast by the base station via system information (SI), for example.

When a UE is performing handover from a serving cell or base station (e.g., a serving gNB) to a target cell or base station (e.g., a target gNB), the default numerology configurations can be forward from the serving cell or base station to the target cell or base station in the handover preparation stage, such as during a handover request message transmission from the serving base station to the target base station. For UE-specific NSSN assignment and Cell-specific NSSN assignment cases, the serving cell or base station may need to forward all of the configurations of default numerology to the target cell or base station. But for the case of NSSN identical/uniform throughout an entire NR wireless network system, the serving cell or base station may only need to forward the NSSN of default numerology to the serving cell or base station.

Case 2: BSR Transmission

When a UE transmits a BSR to a base station (e.g., a gNB), the UE may either implicitly or explicitly notify the base station its numerology preference(s) for a requested uplink resource. In LTE, based on the number of LCGs contained in a BSR control element (CE), the BSR CE can be categorized as long BSR CEs and short BSR CEs.

According to exemplary implementations of the present application, since the more detailed information the base station can gather/accumulate, the better precision on resource allocation for each numerology that the base station can achieve, a new BSR CE category, in addition to long BSR CE and short BSR CE, is introduced in the present application. The new BSR CE category is called LCH BSR CE. The LCH BSR CE contains the resource request corresponding to a single logical channel.

A BSR CE can include various fields. Different categories of BSR CEs may include different fields and/or different combinations. Table-1 below shows various combinations of BSR CE formats, and their corresponding MAC sub-headers. In some BSR CE formats, the default numerology is pre-configured. In other BSR CE formats, the default numerology is not pre-configured.

TABLE 1

The Fields within a Buffer Status Report Control Element.

| BSR CE Field | BSR CE Field Description |
|---|---|
| LCG ID | The Logical Channel Group ID identifies the group of logical channel(s) which buffer status is being reported. The length of the field may be, for example, 3 bits. The number of bits for this field is dependent on the number of logical channels. |
| Buffer Size #X | The Buffer Size field #X identifies the total amount of data available across all logical channels of a logical channel group X, similar to the definition in LTE. The length of the Buffer Size field #X field can be, for example, 8 bits. |
| Buffer Size$_x$ | The Buffer Size$_x$ identifies the total amount of data available for numerology X within a logical channel. The length of the Buffer Size$_x$ field can be, for example, 8 bits. |
| D | The default numerology indicator, D, indicates whether the numerology of the requested uplink resource is limited to default numerology or not. The length of the D field can be, for example, 1 bit. |
| NSSN | The NSSN identifies the numerology preference for a LCG/LCH. The length of the NSSN field can be multiple bits (e.g., 8 bits). The length of the NSSN field can be defined by the base station (e.g., gNB). |
| NSSN # X | The NSSN #X identifies the numerology preference for LCG X. The length of the NSSN #X field can be multiple bits (e.g., 8 bits). The length of the NSSN #X field can be defined by the base station (e.g., gNB). |
| NSSN$_x$ | The NSSN$_x$ identifies the xth numerology preference for a LCH. The length of the NSSN$_x$ field can be multiple bits (e.g., 8 bits). The length of the NSSN$_x$ field can be defined by the base station (e.g., gNB). |
| RN | The Ratio of Numerology identifies the numerology set that UE prefers for all or a portion (e.g., a ratio) of the requested uplink resources for each LCG/LCH. The length of the RN field can be, for example, 2 bits. As the number of bits used in the RN field increases, the finer granularity of reporting can be achieved. |
| RN #X | The RN #X identifies the numerology set that UE prefers for all or a portion (e.g., a ratio) of the requested uplink resources for LCG X. |

TABLE 1-continued

The Fields within a Buffer Status Report Control Element.

| BSR CE Field | BSR CE Field Description |
|---|---|
| $RN_x$ | The length of the RN #X field can be multiple bits (e.g., 2 bits). As the number of bits used in the RN #X field increases, the finer granularity of reporting can be achieved. The $RN_x$ identifies the xth numerology set that UE prefers for all or a portion (e.g., a ratio) of the requested uplink resources for a LCH. The length of the $RN_x$ field can be multiple bits (e.g., 2 bits). As the number of bits used in the $RN_x$ field increases, the finer granularity of reporting can be achieved. |
| LCID | The LCID identifies which resource is requested by which logical channel. |
| R | The R identifies one or more reserve bits reserved for future usage. |

Case 2.1: Pre-Configured Default Numerology with Explicit Numerology Preference Indication When a UE is pre-configured with a default numerology, and when the UE reports a BSR to a base station, a flag bit (e.g., a default numerology indicator, D, field in the MAC sub-header) can be applied by the UE to indicate whether the numerology of the requested uplink resource is limited to the default numerology or not. The flag bit can be placed within a BSR CE.

Figure 4A:
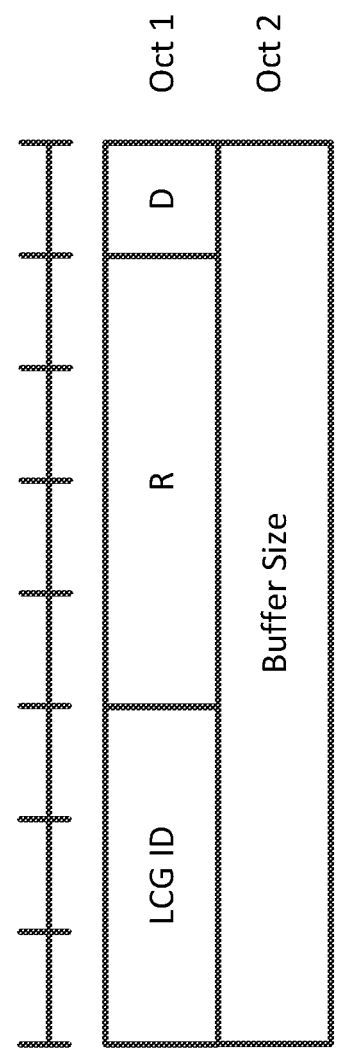
FIG. 4A is a diagram illustrating a short BSR CE with a default numerology indicator, according to an exemplary implementation of the present application.

As shown in FIG. 4A, when a UE is reporting a short BSR CE or truncated BSR CE (e.g., only reporting for a single LCG), a flag bit (e.g., D field) can be placed within the short BSR CE. FIG. 4A illustrates a short BSR CE 400A with a default numerology indicator, according to an exemplary implementation of the present application. In FIG. 4A, since only one LCG's buffer status is reported, the short BSR CE includes a LCG ID in Octet 1, where the LCG ID occupies 3 bits. Also, the default numerology indicator D is included in Octet 1, which means that the numerology of the requested uplink resource is limited to the default numerology. Octet 1 also includes multiple reserve bits (e.g., R), which occupy 4 bits in Octet 1. As shown in FIG. 4A, the short BSR CE also includes Octet 2 reporting the buffer size for the LCG.

Figure 4B:
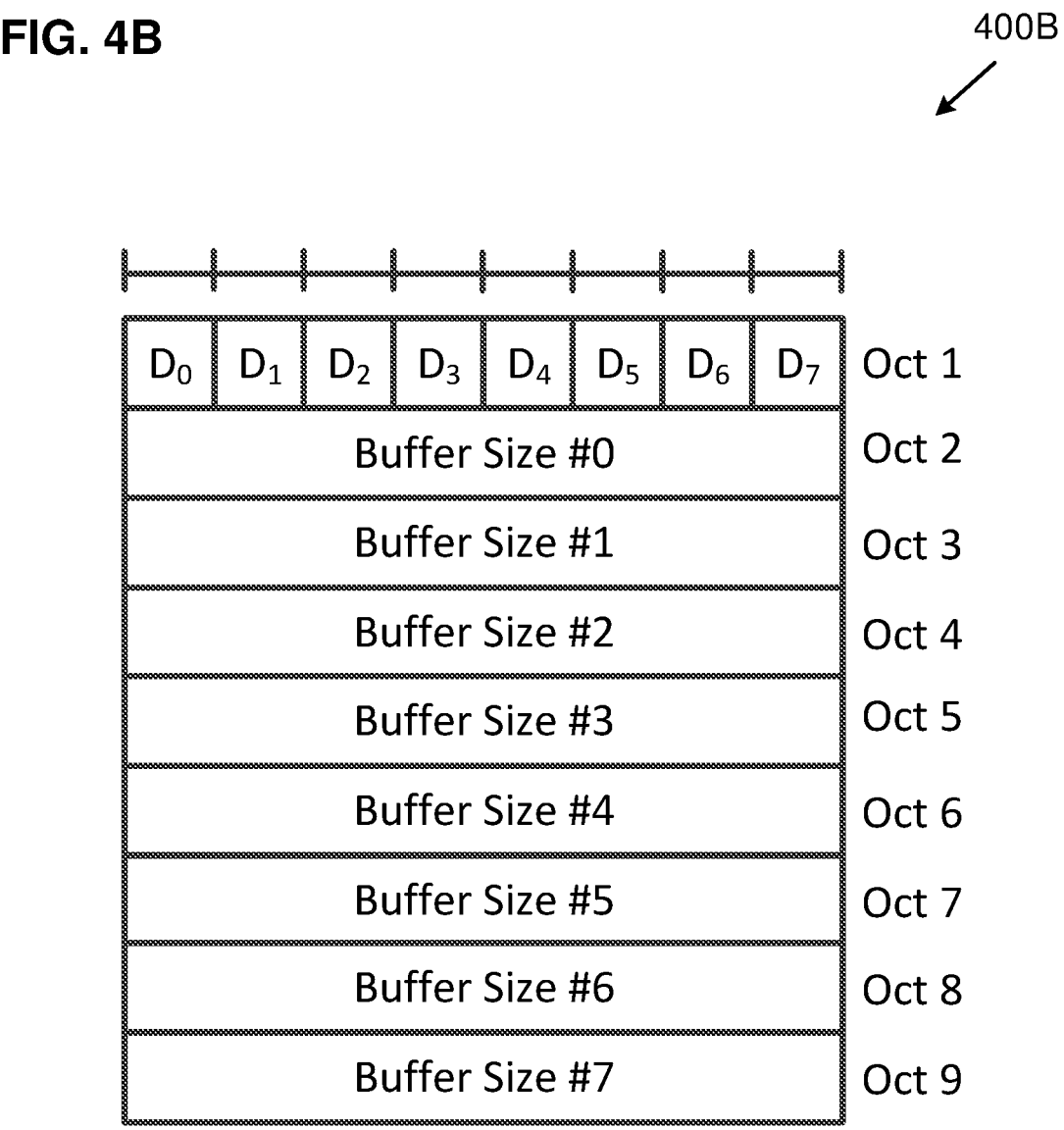
FIG. 4B is a diagram illustrating a long BSR control element with default numerology indicators—Type I, according to an exemplary implementation of the present application.
Figure 4C:
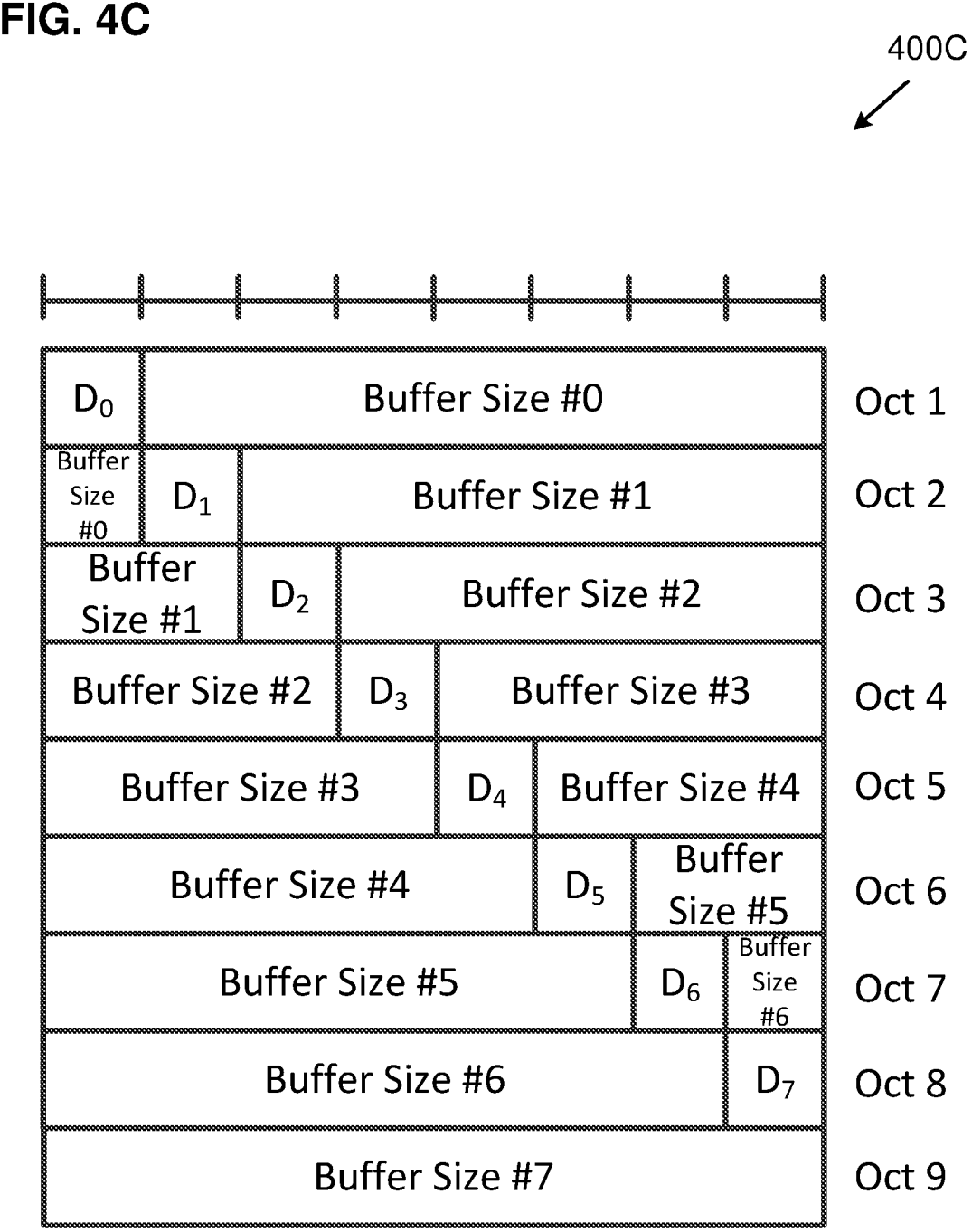
FIG. 4C is a diagram illustrating a long BSR control element with default numerology indicators—Type II, according to an exemplary implementation of the present application.

As shown in FIGS. 4B and 4C, when a UE is reporting a long BSR CE (e.g., reporting for multiple LCGs), each LCG may include its own flag bit within the long BSR CE. FIG. 4B illustrates a long BSR control element with default numerology indicators—Type I, according to an exemplary implementation of the present application. As shown in FIG. 4B, in a long BSR CE 400B, the flag bit for each LCG may be placed together in Octet 1, while the buffer size for each corresponding LCG is placed in a separate octet in the long BSR CE (e.g., Buffer size #0 through Buffer size #7 being placed in Octet 2 through Octet 9, respectively). FIG. 4C illustrates a long BSR control element with default numerology indicators—Type II, according to an exemplary implementation of the present application. As shown in FIG. 4C, in another implementation, the flag bit for each LCG may be placed in a separate octet along with the corresponding LCG's buffer size field as shown in FIG. 4C. In FIG. 4C, in a long BSR CE 400C, the buffer size for $LCG_0$ (e.g., Buffer Size #0) occupies 7 bits in Octet 1, and 1 bit in Oct 2. The buffer size for $LCG_1$ (e.g., Buffer Size #1) occupies 6 bits in Octet 2, and 2 bits in Oct 3. The buffer size for $LCG_2$ (e.g., Buffer Size #2) occupies 5 bits in Octet 3, and 3 bits in Oct 4, and so on. The flag bit for each LCG may be placed in front of its corresponding buffer size. For example, the default numerology indicator for $LCG_0$ (e.g., Do) is placed in Octet 1 and in front of Buffer Size #0. Similarly, the default numerology indicator for $LCG_1$ (e.g., Di) is placed in Octet 2 and in front of Buffer Size #1, and so on. As shown in FIG. 4C, the default numerology indicator for $LCG_7$ (e.g., $D_7$) is placed in Octet 8 and in front of Buffer Size #7 in Octet 9.

If a flag bit(s) is not set up, it implies that the uplink resource the UE is requesting does not have any restriction or limitation on numerology (e.g., not subject to default numerology). It is noted that, in FIGS. 4B and 4C, since the long BSR CE is used, the LCG IDs are not necessary since all of the LCGs including their default numerology indicators and buffer sizes are included in the long BSR CE.

Figure 4D:
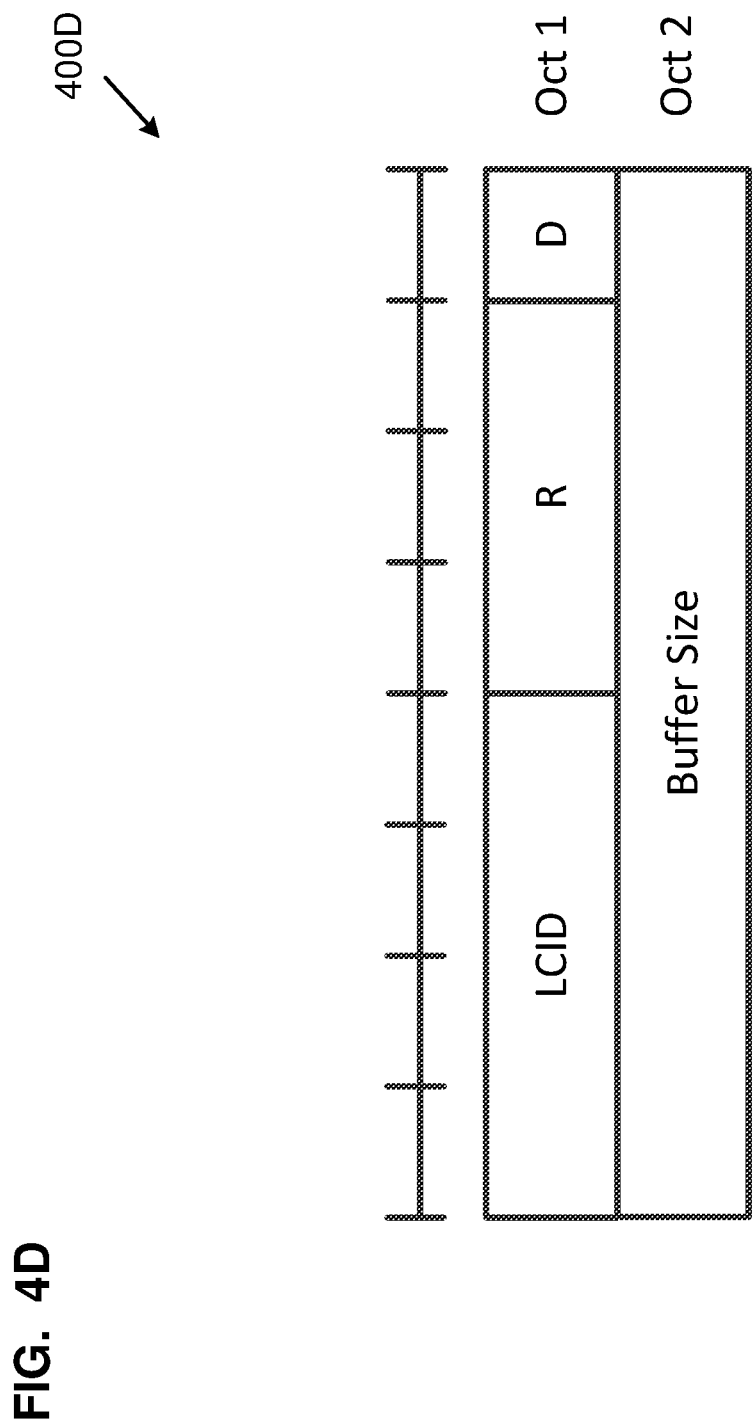
FIG. 4D is a diagram illustrating a LCH BSR CE with a default numerology indicator, according to an exemplary implementation of the present application.

FIG. 4D illustrates an exemplary format of a LCH BSR CE with a default numerology indicator, according to an exemplary implementation of the present application. In FIG. 4D, a UE is reporting resource request for a single logical channel. In FIG. 4D, a LCH BSR CE 400D includes a LCID in Octet 1, where the LCID indicates which logical channel sent the BSR. In the present exemplary implementation, the LCID occupies 4 bits in Octet 1. Also, the default numerology indicator D is included in Octet 1, which means that the numerology of the requested uplink resource is limited to the default numerology. Octet 1 also includes multiple reserve bits (e.g., R), which occupy 3 bits in Octet 1. As shown in FIG. 4D, the LCH BSR CE also includes Octet 2 which includes the buffer size, where the buffer size indicates the amount of data available for the logical channel as identified by the LCID.

Figure 5A:
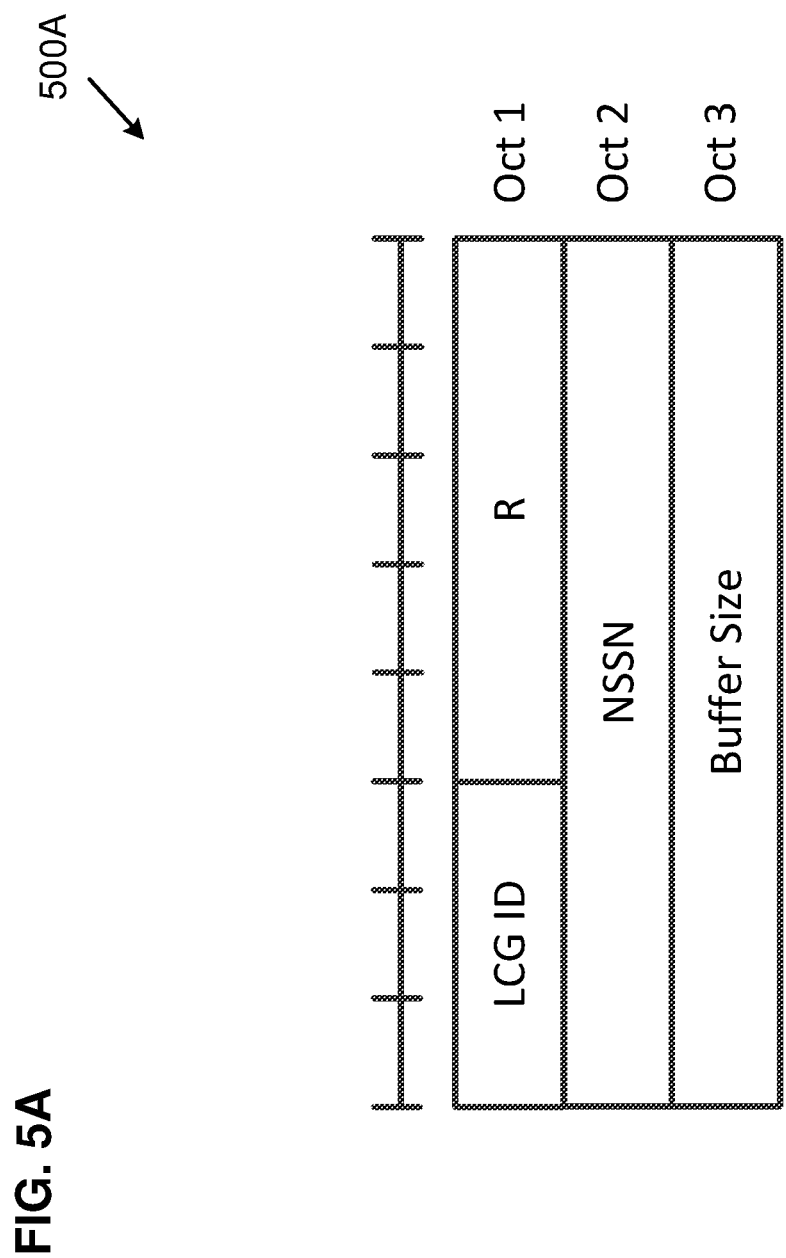
FIG. 5A is a diagram illustrating a short BSR CE with an NSSN, according to an exemplary implementation of the present application.
Figure 5B:
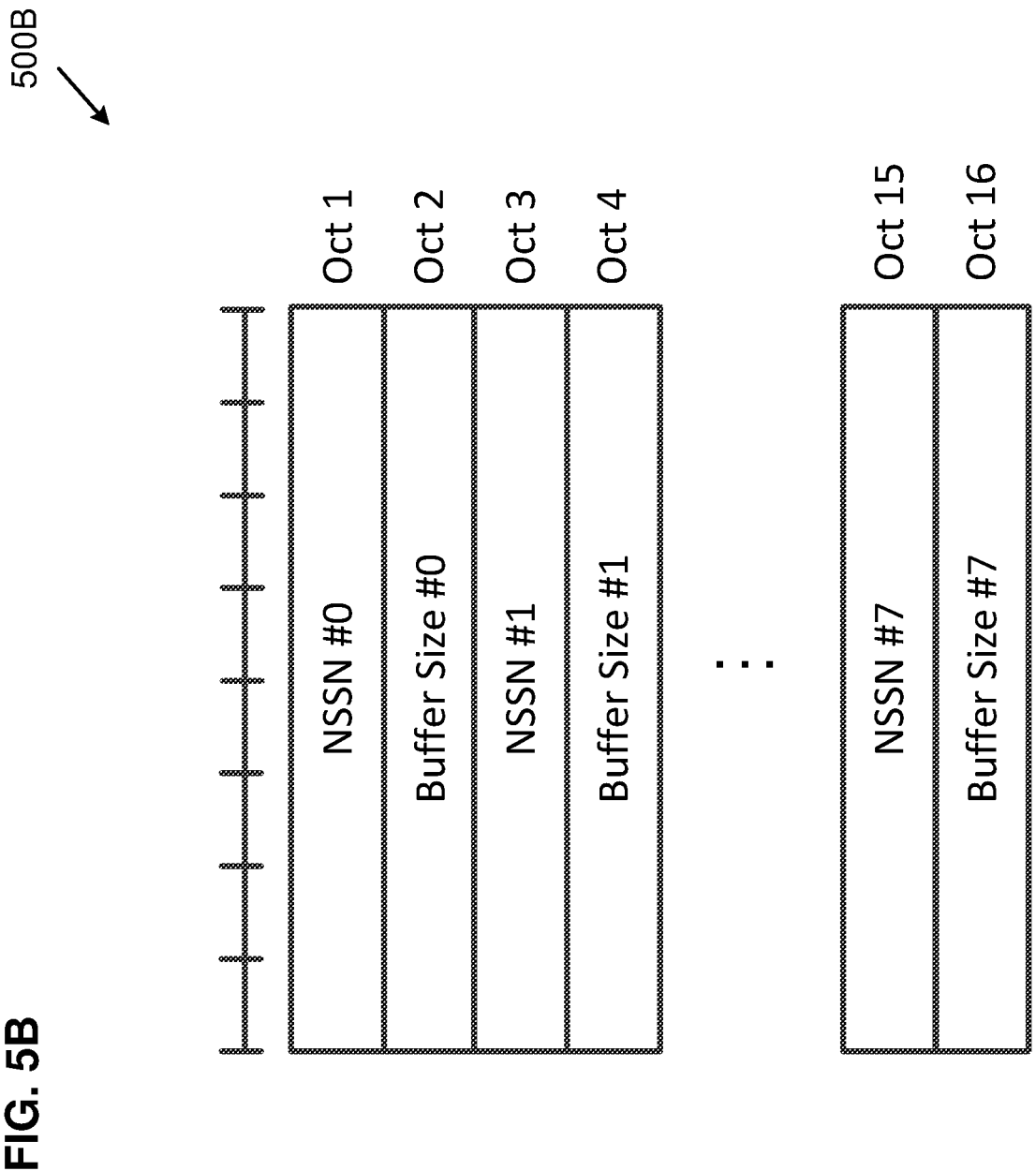
FIG. 5B is a diagram illustrating a long BSR CE with NSSNs, according to an exemplary implementation of the present application.

Case 2.2: No Default Numerology Pre-Configured with Explicit Numerology Preference Indication As shown in FIGS. 5A and 5B, when a default numerology is not pre-configured, a UE may include one or more numerology indicators (e.g., NSSNs) to inform a base station the numerology corresponding to each LCG explicitly in the BSR CE. Each LCG has its own numerology indicator.

FIG. 5A illustrates a short BSR CE with an NSSN, according to an exemplary implementation of the present application. As shown in FIG. 5A, when a UE is reporting a short BSR CE or truncated BSR CE (e.g., only reporting for a single LCG), an NSSN can be placed within the short BSR CE. FIG. 5A illustrates a short BSR CE 500A with a numerology indicator (e.g., an NSSN). In FIG. 5A, since only a single LCG's buffer status is reported, the short BSR CE 500A includes a LCG ID in Octet 1, where the LCG ID occupies 3 bits. The rest of Octet 1 is occupied by 5 reserve bits (e.g., R). In the short BSR CE 500A, an NSSN is included in Octet 2. In addition, the short BSR CE 500A also includes Octet 3 reporting a buffer size for the LCG.

FIG. 5B illustrates a long BSR CE with NSSNs, according to an exemplary implementation of the present application. In FIG. 5B, a long BSR CE 500B includes buffer status reports for all of the LCGs (including the NSSNs for the corresponding LCGs) at the same time. As shown in FIG. 5B, when a UE is reporting a long BSR CE (e.g., reporting for multiple LCGs), each LCG may include its own numerology indicator (e.g., NSSN #X) within the long BSR CE. As shown in FIG. 5B, NSSN #0 occupies Octet 1, while the buffer size for the corresponding $LCG_0$ (e.g., Buffer Size #0) is placed in Octet 2. NSSN #1 occupies Octet 3, while the buffer size for the corresponding $LCG_1$ (e.g., Buffer Size #1) is placed in Octet 4. It is noted that in FIG. 5B, since the long BSR CE is used, the LCG IDs are not necessary since all of the LCGs including their numerology indicators (NSSNs) and buffer sizes are included in the long BSR CE 500B.

Figure 5C:
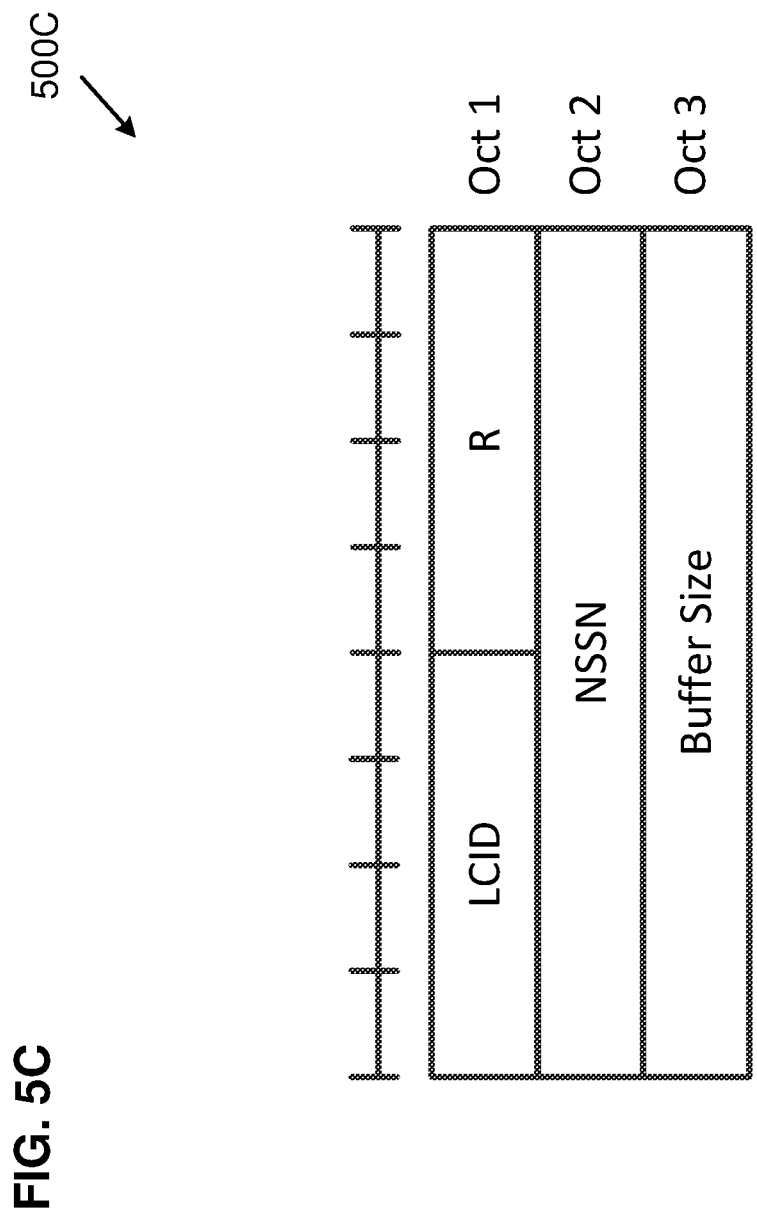
FIG. 5C is a diagram illustrating a LCH BSR CE with a numerology indicator, according to an exemplary implementation of the present application.

FIG. 5C illustrates an exemplary format of a LCH BSR CE with a single numerology indicator (e.g., NSSN), according to an exemplary implementation of the present application. In FIG. 5C, a UE is reporting resource request for a single logical channel. In FIG. 5C, a LCH BSR CE 500C includes a LCID in Octet 1, where the LCID indicates which logical channel sent the BSR. In the present exemplary implementation, the LCID occupies 4 bits in Octet 1. The remaining bits in Octet 1 are occupied by reverse bits (e.g., R). The numerology indicator, NSSN, is included in Octet 2, where the NSSN indicates the preferred numerology for the logical channel having the LCID specified in Octet 1. As shown in FIG. 5C, the LCH BSR CE 500C also includes Octet 3 reporting the buffer size, where the buffer size indicates the amount of data available for the logical channel having the LCID specified in Octet 1.

Figure 5D:
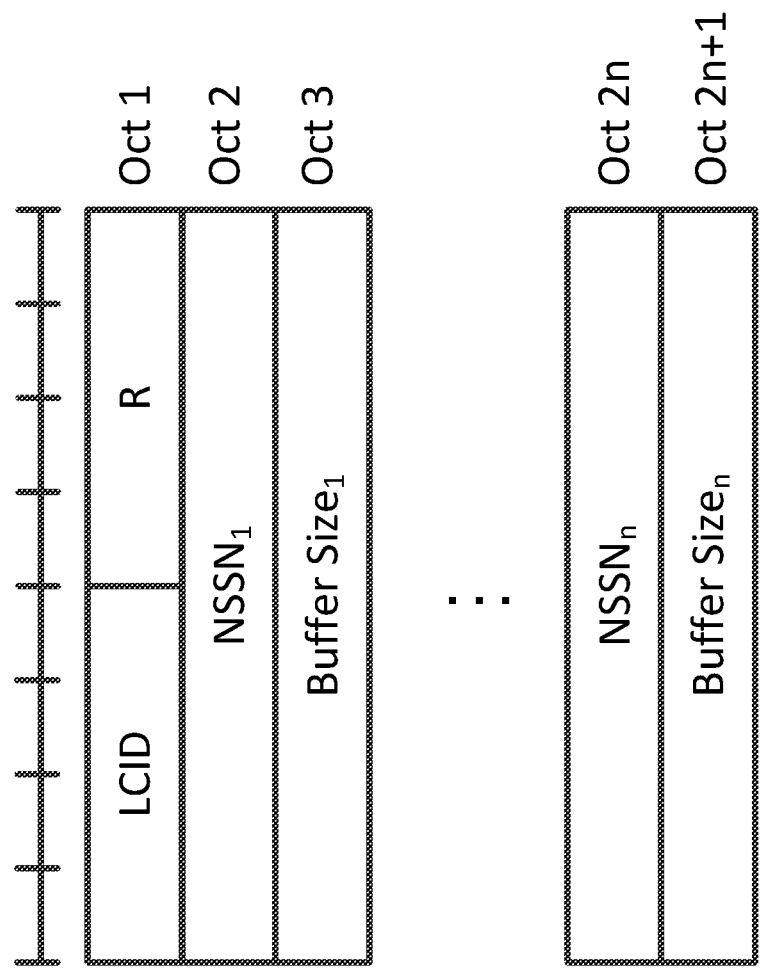
FIG. 5D is a diagram illustrating a LCH BSR CE with multiple numerology indicators, according to an exemplary implementation of the present application.

FIG. 5D illustrates a LCH BSR CE with multiple numerology indicators (e.g., NSSNs), according to an exemplary implementation of the present application. In one exemplary implementation, the BSR format is used when a UE needs to request uplink radio resource for a single LCH with multiple numerologies in order to be more precise for each numerology. In FIG. 5D, the UE is reporting resource request for a single logical channel. In FIG. 5D, a LCH BSR CE 500D includes a LCID in Octet 1, where the LCID indicates which logical channel sent the BSR. In the present exemplary implementation, the LCID occupies 4 bits in Octet 1. The remaining bits in Octet 1 are occupied by reverse bits (e.g., R). The UE indicates the amount of uplink radio resource needed by adding the corresponding NSSN and Buffer Size field for each of the numerologies. The number of NSSNs and Buffer Size fields depend on the number of numerologies the UE requests. Thus, the number of octets in the LCH BSR CE 500D may vary.

Figure 6A:
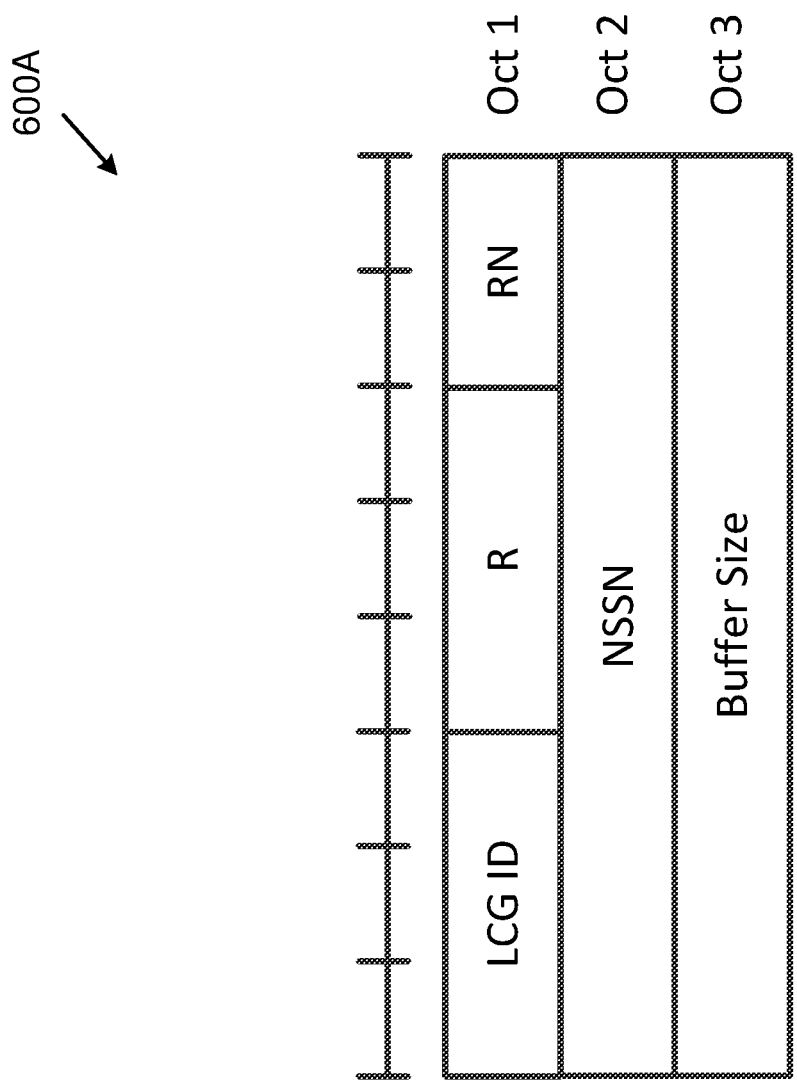
FIG. 6A is a diagram illustrating a short BSR CE with a numerology indicator and a 2-bit ratio of numerology, according to an exemplary implementation of the present application.
Figure 6B:
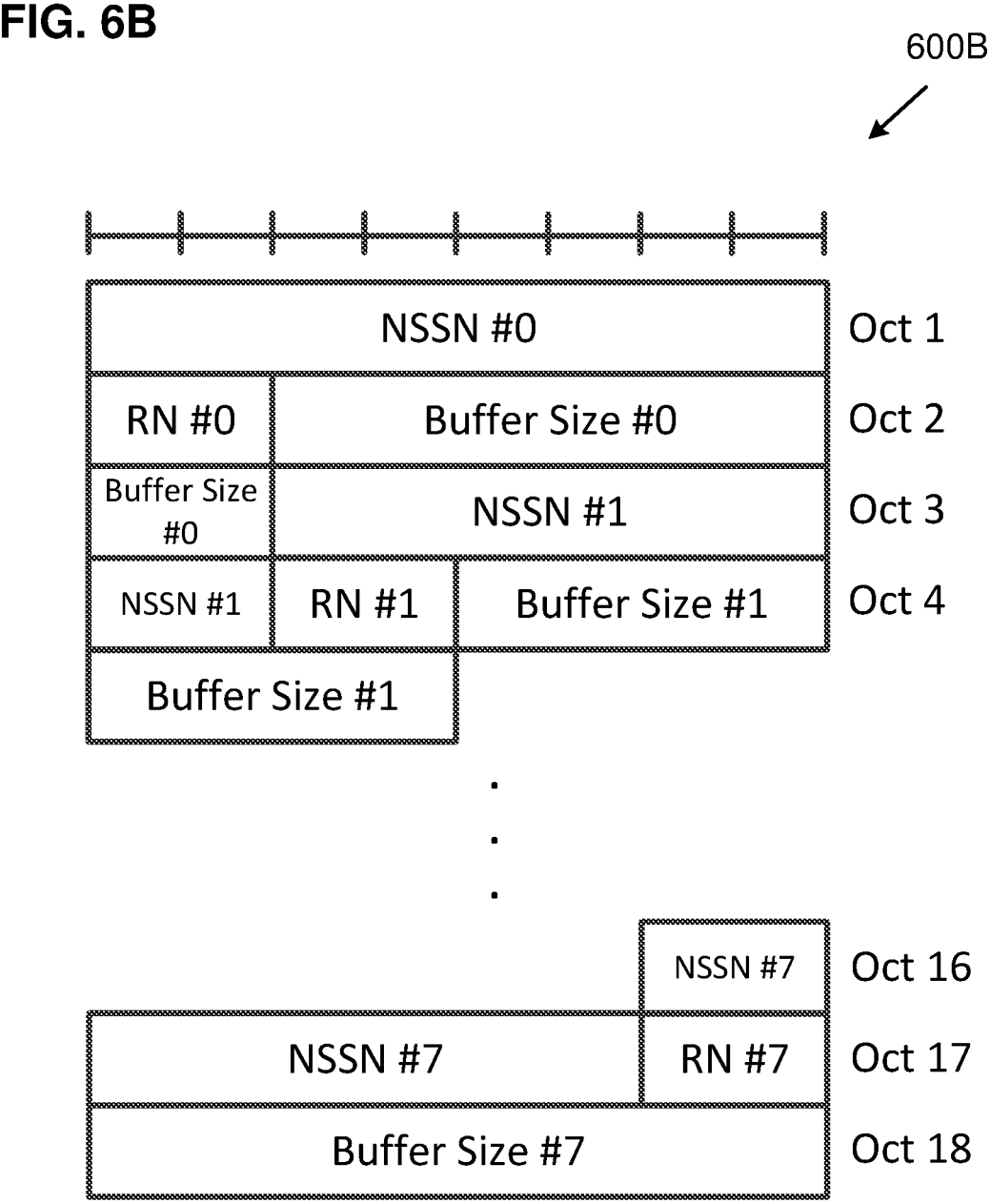
FIG. 6B is a diagram illustrating a long BSR CE with numerology indicators and corresponding ratios of numerology, according to an exemplary implementation of the present application.
Figure 6C:
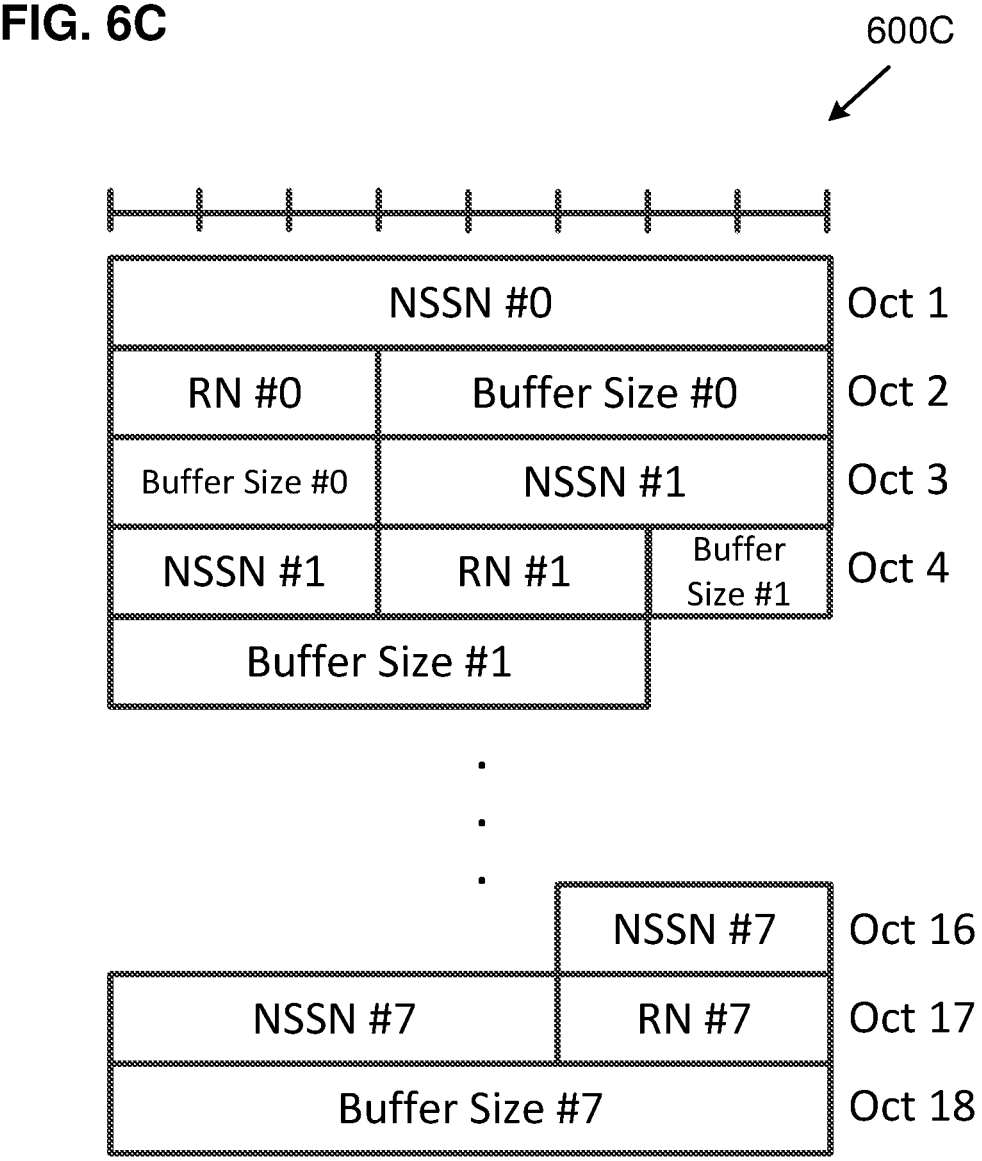
FIG. 6C is a diagram illustrating a long BSR CE with numerology indicators and corresponding ratios of numerology, according to an exemplary implementation of the present application.

FIG. 6A illustrates a short BSR CE 600A with a numerology indicator and a ratio of numerology, according to an exemplary implementation of the present application. FIG. 6B illustrates a long BSR CE 600B with numerology indicators and corresponding 2-bit ratios of numerology, according to an exemplary implementation of the present application. FIG. 6C illustrates a long BSR CE 600C with numerology indicators and corresponding 3-bit ratios of numerology, according to an exemplary implementation of the present application. As illustrated in FIGS. 6A, 6B, and 6C, a BSR CE may include an extra field, RN (Ratio of Numerology) for indicating the numerology that the UE prefers for all or a portion of the requested uplink resource for a LCG or for all of the LCGs. For example, the UE can follow a ratio table defined and configured by a base station (e.g., gNB) to indicate the ratio. In one implementation, if 2 bits are applied for indicating the ratio in the RN field, "00" may indicate that 25% of the requested uplink resource for the corresponding LCG is limited to the preferred numerology and the remaining percentage of the requested uplink resource does not have any limitation. Similarly, "01", "10", and "11" may indicate that 50%, 75%, and 100%, respectively, of the requested uplink resource for the corresponding LCG is limited to the preferred numerology and the remaining percentage of the requested uplink resource does not have any limitation. The more bits used for indicating the ratio, the finer the granularity that the ratio can be indicated. Also, the UE can use the RN to indicate that it only expects/needs uplink radio resource on specific numerology (ies). RN may occupy 3 bits as shown in FIGS. 6C, 7B, 8B, and 9B, for example.

Figure 7A:
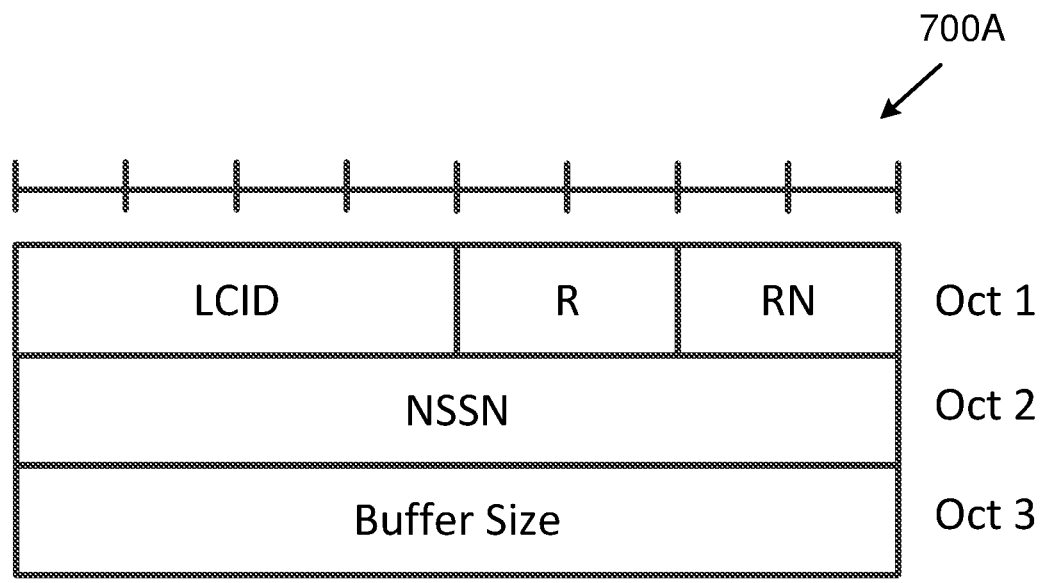
FIG. 7A is a diagram illustrating a LCH BSR CE with a single NSSN and a 2-bit ratio of numerology, according to an exemplary implementation of the present application.
Figure 7B:
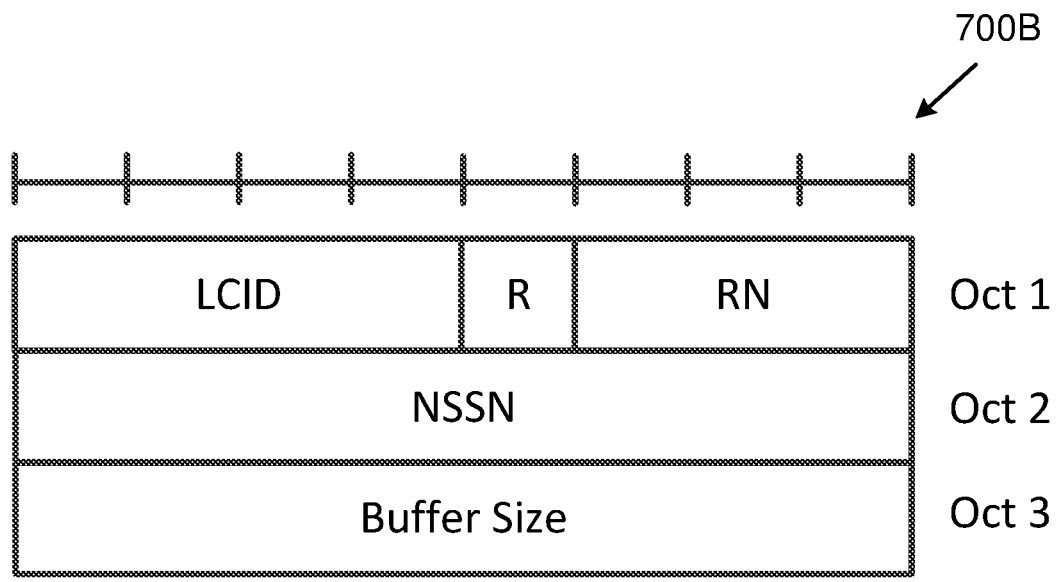
FIG. 7B is a diagram illustrating a LCH BSR CE with a single NSSN and a 3-bit ratio of numerology, according to an exemplary implementation of the present application.

FIG. 7A illustrates a LCH BSR CE 700A with a single NSSN and a 2-bit RN. In FIG. 7A, a UE is reporting resource request for a single logical channel. In FIG. 7A, the LCH BSR CE includes a LCID in Octet 1, where the LCID indicates which logical channel sent the BSR. In the present exemplary implementation, the LCID occupies 4 bits in Octet 1. Octet 1 also includes an RN occupying 2 bits. The rest of Octet 1 is occupied by 2 reserve bits (e.g., R). The LCH BSR CE includes Octet 2 having an NSSN that indicates the preferred numerology for the LCH identified by the LCID in Octet 1. The LCH BSR CE also includes Octet 3 which includes a buffer size, where the buffer size indicates the amount of data available for the LCH identified by the LCID in Octet 1. The RN in Octet 1 indicates a percentage (e.g., 25%, 50%, 75%, and 100%) of the total buffer size that the UE desires the uplink radio resource to have with the preferred numerology. FIG. 7B illustrates a LCH BSR CE 700B with a single NSSN and a 3-bit ratio of numerology, according to an exemplary implementation of the present application. Different from FIG. 7A, the NSSN in FIG. 7B occupies 3 bits in Octet 1, while the remaining bit of Octet 1 is occupied by 1 reserve bit (e.g., R). Having a 3-bit NSSN allows the UE to achieve a finer granularity for the ratio of numerology (e.g., 12.5%, 25%, 37.5%, 50%, 62.5%, 75%, 87.5%, and 100%).

Figure 8A:
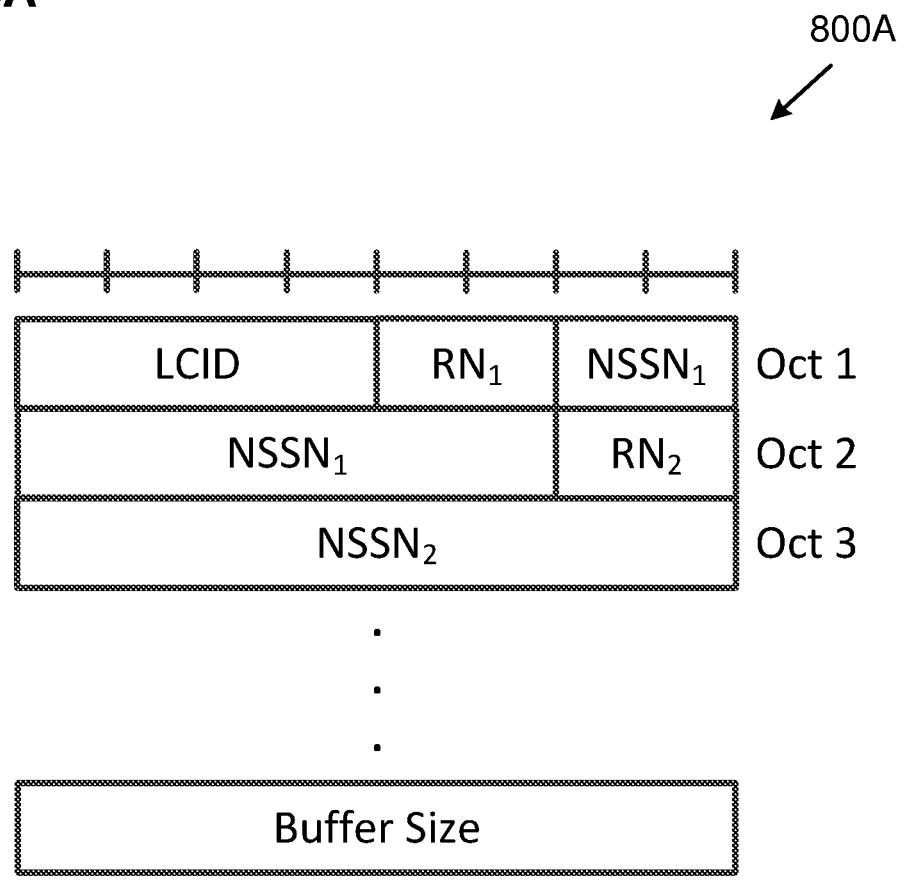
FIG. 8A is a diagram illustrating a LCH BSR CE with multiple NSSNs and multiple 2-bit ratios of numerology, according to an exemplary implementation of the present application.
Figure 8B:
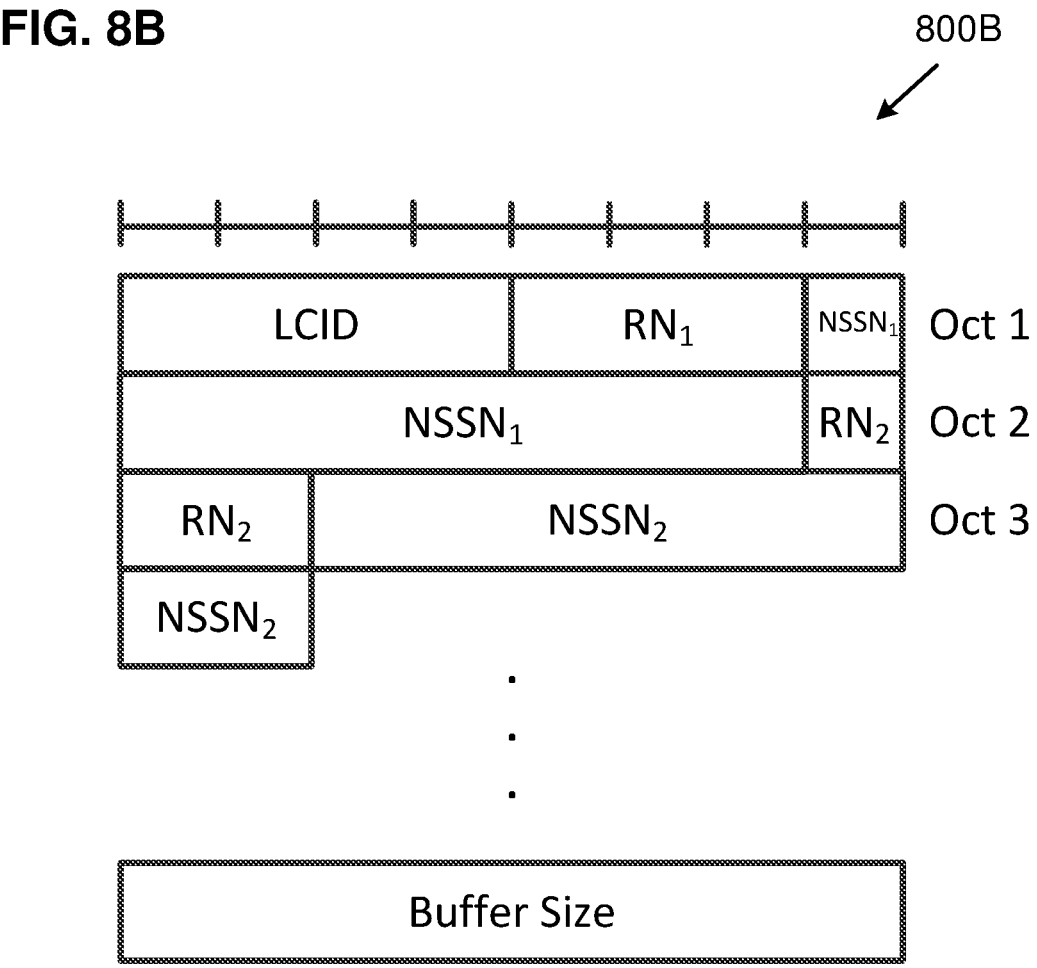
FIG. 8B is a diagram illustrating a LCH BSR CE with multiple NSSNs and multiple 3-bit ratios of numerology, according to an exemplary implementation of the present application.

FIG. 8A illustrates a LCH BSR CE with multiple NSSNs and multiple 2-bit ratios of numerology, according to an exemplary implementation of the present application. In FIG. 8A, the LCH BSR CE format is used when a UE needs to request uplink radio resource for a single LCH having multiple numerologies. As illustrated in FIG. 8A, in the LCH BSR CE 800A, the UE may indicate the total amount of uplink radio resource on all of the numerologies by a Buffer Size field. Also, the UE may indicate the amount of uplink radio resource requested on each numerology by having multiple RNs and NSSNs. The number of NSSNs and the RNs fields are the same as the number of numerologies, respectively, that the UE requests. Thus, the length of the LCH BSR CE 800A may vary based on the number of numerologies the LCH prefers to configure. FIG. 8B illustrates a LCH BSR CE 800B with multiple NSSNs and multiple 3-bit ratios of numerology, according to an exemplary implementation of the present application. It should be noted that, in FIGS. 8A and 8B, the total the sum of the percentages reflected by the corresponding RNs should be less than or equal to 100%.

Figure 9A:
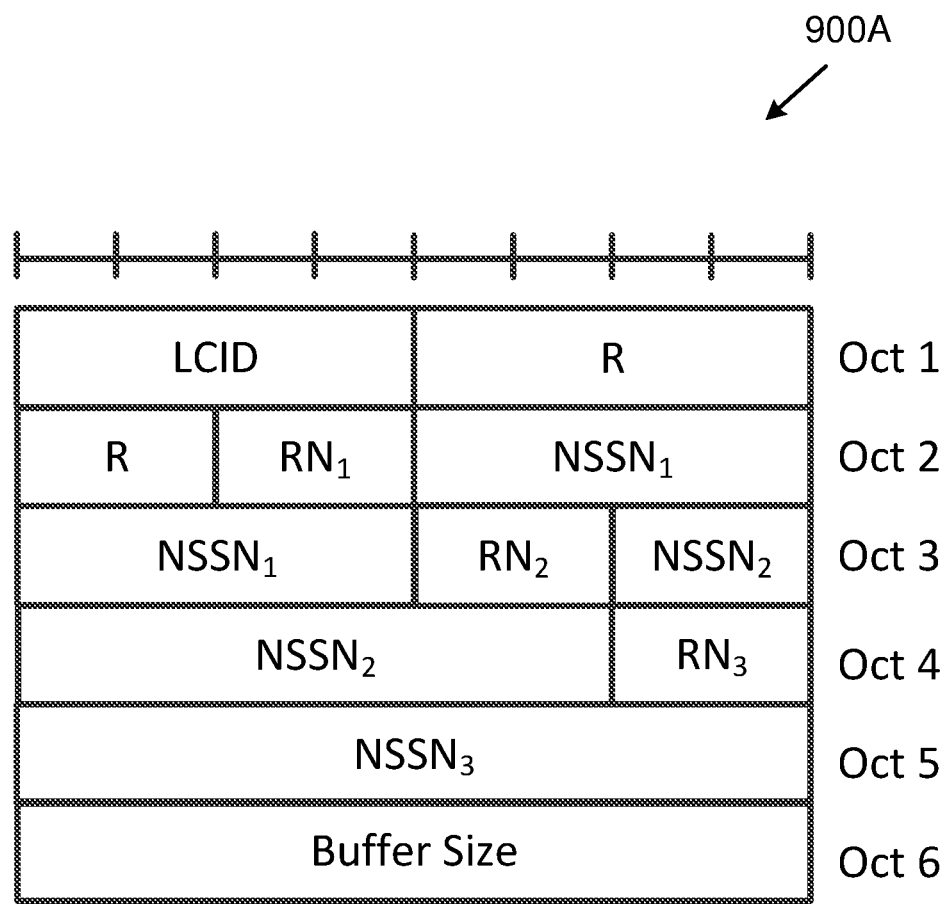
FIG. 9A is a diagram illustrating a LCH BSR CE with three NSSNs and three 2-bit ratios of numerology, according to an exemplary implementation of the present application.

FIG. 9A illustrates an exemplary format of a LCH BSR CE 900A with three NSSNs and three 2-bit ratios of numerology, according to an exemplary implementation of the present application. FIG. 9B illustrates an exemplary format of a LCH BSR CE 900B with three NSSNs and three 3-bit ratios of numerology, according to an exemplary implementation of the present application.

According to exemplary implementations of the present application, a UE may use the LCID field in the MAC sub-header to indicate the format of the transmitted BSR CE. Table-2 shows a list of LCIDs and their corresponding BSR formats, according to an exemplary implementation of the present application. It is noted that the values of the LCIDs shown in Table-2 are intend for illustration purpose only, as other values and total number to bits may be used for the LCIDs.

TABLE 2

Examples of Values of LCID

| LCID | BSR Format |
|---|---|
| 000000 | Short BSR control element with default numerology indication |
| 000001 | Long BSR control element with default numerology indication - Type I |
| 000010 | Long BSR control element with default numerology indication - Type II |
| 000011 | LCH BSR control element with default numerology indication |
| 000100 | Short BSR control element with NSSN |
| 000101 | Long BSR control element with NSSN |
| 000110 | LCH BSR control element with single NSSN |
| 000111 | LCH BSR control element with multiple NSSN |
| 001000 | Short BSR control element with NSSN and RN |
| 001001 | Long BSR control element with NSSN and RN (2 bits) |
| 001010 | Long BSR control element with NSSN and RN (3 bits) |
| 001011 | LCH BSR control element with single NSSN and RN (2 bits) |
| 001100 | LCH BSR control element with single NSSN and RN (3 bits) |
| 001101 | LCH BSR control element with multiple NSSN and RN (2 bits) |
| 001110 | LCH BSR control element with multiple NSSN and RN (3 bits) |

Case 2.3: Pre-Configured Default Numerology with Implicit Numerology Preference Indication Similar as Case 2.1 above, a UE may notify a base station (e.g., gNB) whether the request uplink resource is limited to default numerology or not. Different from Case 2.1, instead of using a default numerology indicator (e.g., D), the UE in the present implementation uses a predefined logical channel ID (LCID) in the BSR message (e.g., LCID within the corresponding sub-header for the BSR) for the base station to distinguish whether the request uplink resource is limited to default numerology or not. For example, the LCID may be applied in a short BSR message containing a single LCG.

Case 2.4: No Default Numerology Pre-Configured with Implicit Numerology Preference Indication In this exemplary implementation, a base station (e.g., gNB) may configure a physical uplink shared channel (PUSCH) for each numerology. Thus, each numerology has its own PUSCH allocated by the base station. A UE may implicitly notify the base station its preferred numerology through the specific PUSCH by which the UE transmits the BSR message. For example, when a UE needs uplink radio resource having a specific numerology, the UE may transmit a BSR message through a PUSCH that specifically corresponds to the UE's preferred numerology to notify the base station about the UE's preferred numerology. It should be noted that the UE may also include a numerology indicator in a BSR message for requesting uplink resource having other numerologies.

Case 3: BSR Retransmission

Figure 10:
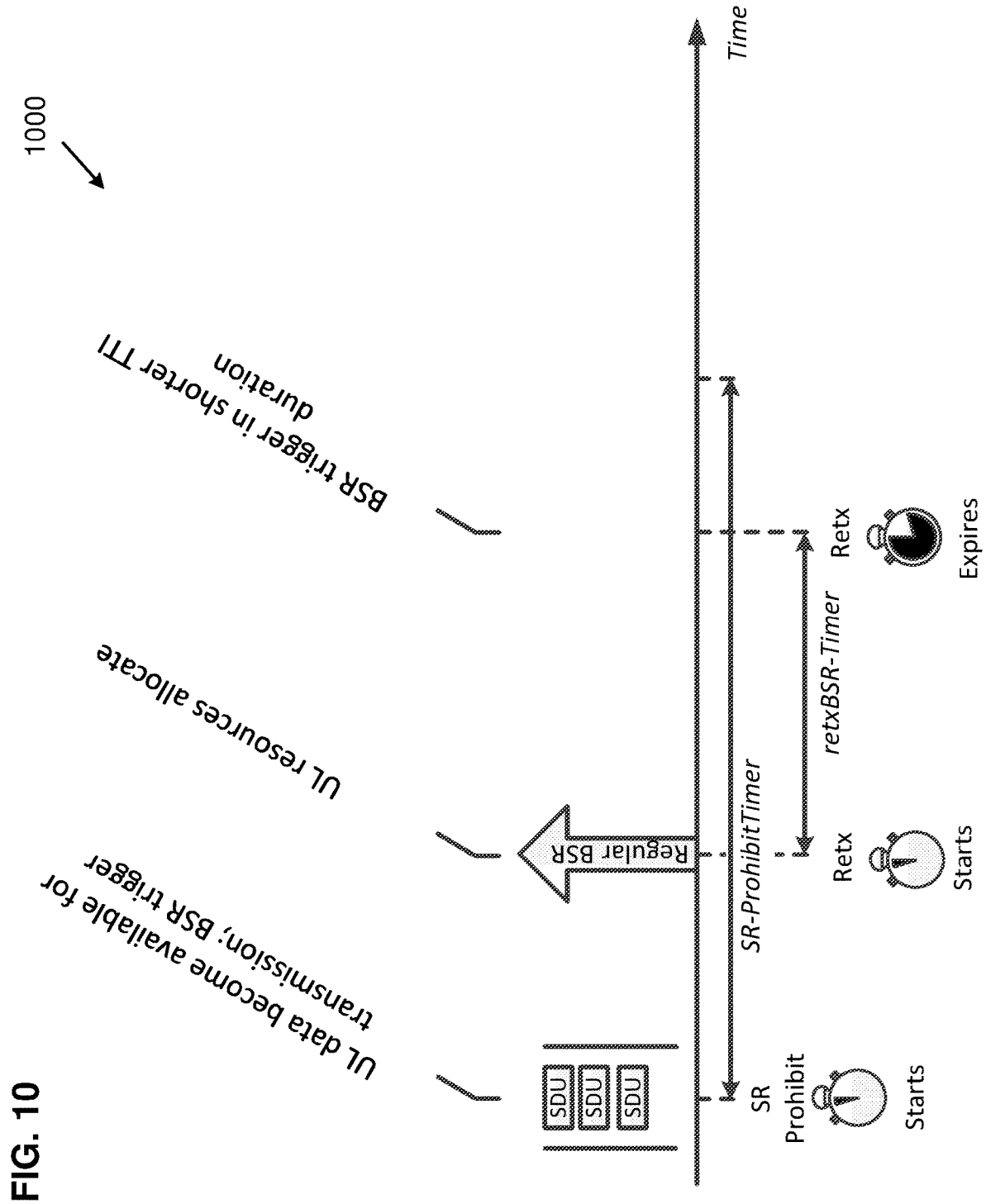
FIG. 10 is a diagram illustrating a BSR retransmission diagram with a BSR retransmission timer and a scheduling request timer, according to an exemplary implementation of the present application.
Figure 11:
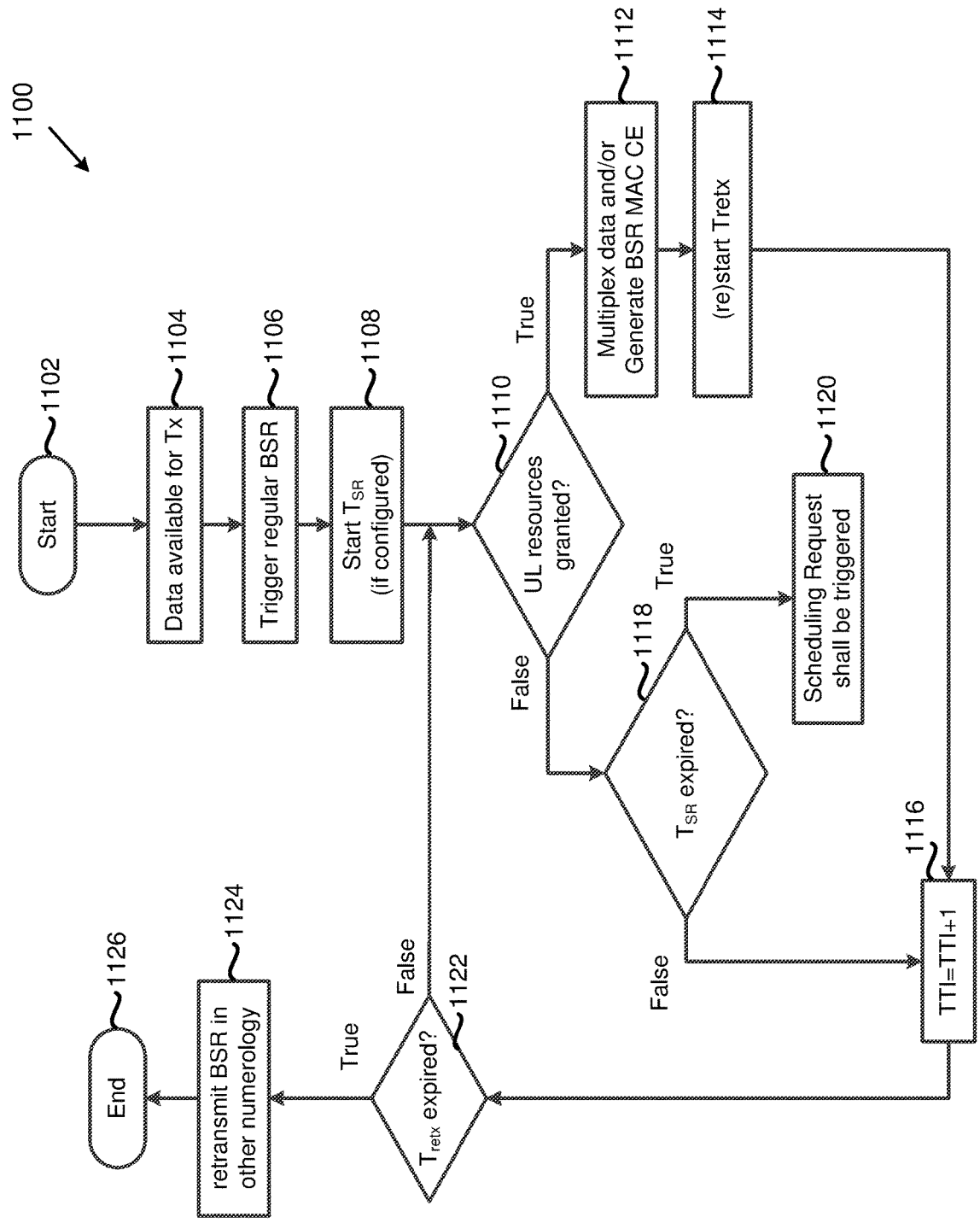
FIG. 11 is a diagram illustrating a BSR retransmission flow diagram with a BSR retransmission timer and a scheduling request timer, according to an exemplary implementation of the present application.

FIG. 10 illustrates a BSR retransmission diagram 1000 with a BSR retransmission (Retx) timer and a scheduling request timer, according to an exemplary implementation of the present application. FIG. 11 illustrates a BSR retransmission flow diagram with a BSR retransmission timer and a scheduling request timer, according to an exemplary implementation of the present application. As shown in FIGS. 10 and 11, a BSR retransmission timer is configured to overcome a situation where a UE had sent a BSR message but has not received any uplink resource after a predetermined time set be the BSR retransmission timer (retxBSR-Timer). In such case, the UE is allowed to trigger a BSR retransmission after the retxBSR-Timer is expired. In the case of numerology preference mechanism described in Case 2.4 above is applied, the UE may request uplink radio resource having a specific numerology by transmitting a BSR message on a specific PUSCH that corresponds to the preferred numerology. In one exemplary implementation, since the data ready for transmission has been already queued in the buffer for a while (e.g., longer that predetermined time of the retxBSR-Timer), it may be beneficial for the UE to trigger BSR retransmission in any numerology/OFDM symbol which has shorter/shortest TTI duration to reduce reporting latency. This procedure may apply to a portion of the logical channels. For example, the base station can configure an across numerology restriction mask for one or more logical channels that have permission to retransmit BSRs in other numerologies.

In another implementation, by configuring a SR_direct mask for a specific LCH/LCG, the base station (e.g., gNB) may configure/limit the specific LCH/LCG to perform scheduling request (SR) transmission directly, if the waiting time on a SR resource is shorter than the resource on BSR retransmission. For example, the SR_direct mask can be configured within a downlink RRC message (e.g., RRCReconfiguration).

As shown in FIG. 11, flow chart 1100 starts with action 1102. In action 1104, there is uplink data for a logical channel becomes available for transmission in the buffer (either RLC entity or in the PDCP entity). In action 1106, the UE triggers a regular BSR procedure. In action 1108, if the logical channel is configured with Scheduling Request prohibit timer (SR-ProhibitTimer, $T_{SR}$), the UE starts or restart the SR-ProhibitTimer.

In action 1110, the UE waits for uplink resource grant for devierling BSR message (MAC control element). If the UE is granted UL resources for new transmission for this TTI, the UE transmits the BSR message in action 1112. Then, the UE starts or restarts a BSR message retransmission timer (retxBSR-Timer, $T_{retx}$) configured by the base station (e.g., gNB) in action 1114. The flow chart 1110 proceeds from action 1114 to action 1116 to increment the TTI to TTI+1.

If the UE is not granted with any UL resources for new transmission for this TTI, the UE may trigger an SR procedure in action 1120, if the BSR has been triggered, and the $T_{SR}$ is not running or has expired in action 1118. If the $T_{SR}$ is not expired, then, the flow chart 1110 proceeds from action 1118 to action 1116 to increment the TTI to TTI+1.

In action 1122, if the BSR tretransmission timer ($T_{retx}$) is expired, then the flow chart 1100 proceeds to action 1124, where the UE retransmits the BSR in another numerology. In action 1122, if the BSR tretransmission timer ($T_{retx}$) has not expired, then the flow chart 1100 proceeds to action 1110, where the UE waits for UL resources to be granted by the base station. The flow chart 1100 ends with action 1126.

Case 4: Scheduling Request (SR)

Figure 12:
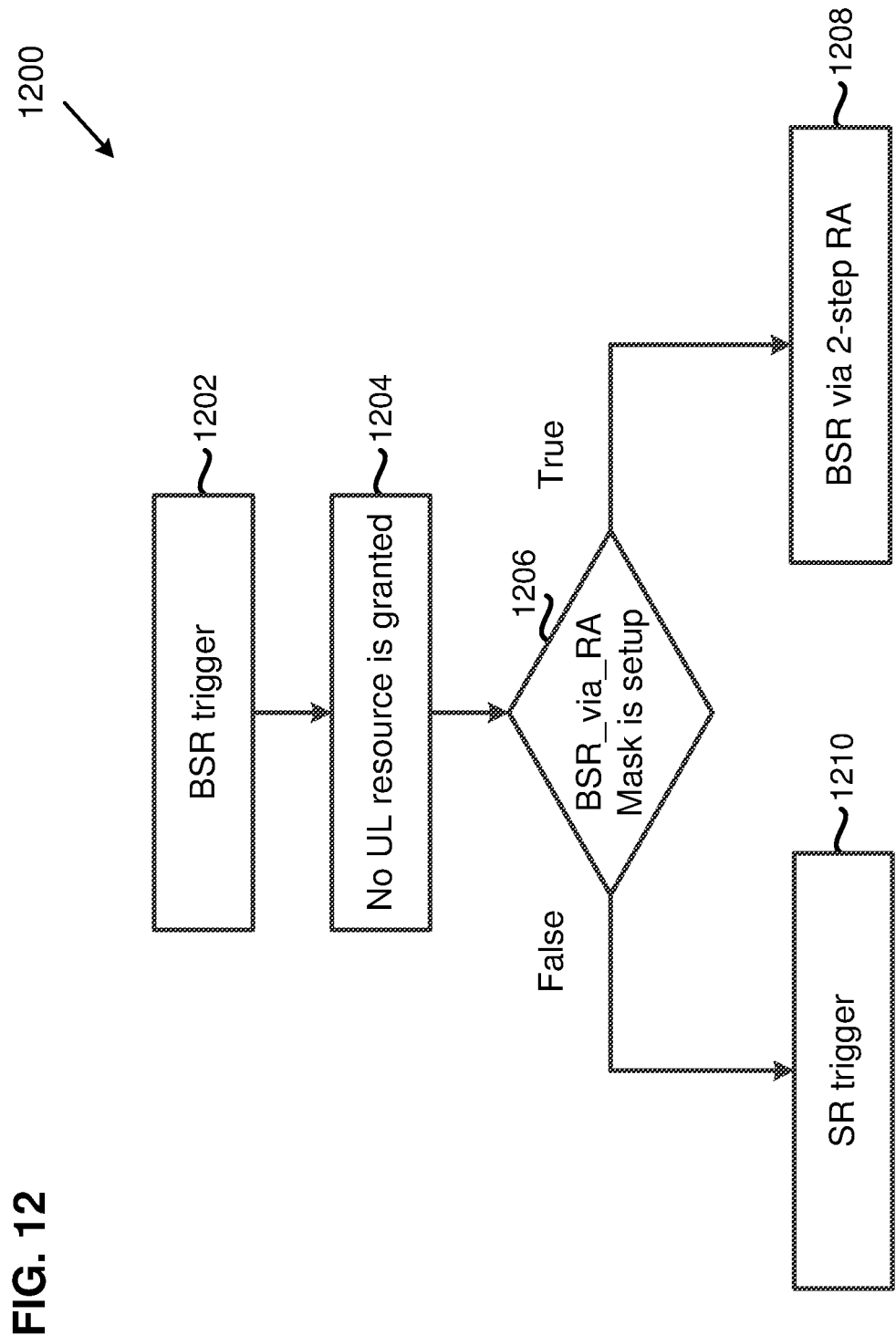
FIG. 12 is a diagram illustrating a two-step random access procedure for BSR, according to an exemplary implementation of the present application.

Case 4.1: Masking Specific LCH for Triggering Random Access with Small Data Transmission when No BSR Resource is Granted FIG. 12 illustrates a two-step random access procedure for BSR, according to an exemplary implementation of the present application. As shown in flow diagram 1200, once a BSR had been sent from a UE to a base station in action 1202, and no uplink resource is granted by the base station in action 1204, the UE may use a two-step random access (RA) procedure to transmit its BSR message and/or a small amount of data in its buffer directly to the base station. The UE may include its BSR message in MSG 1 (e.g., a preamble, or a mapping resource). Before using the two-step RA procedure in action 1208, the UE may need to check whether a BSR transmission via a two-step RA mask for a corresponding logical channel is setup/configured by the base station in action 1206. The UE can use two-step RA mask only when the mask for the corresponding logical channel is setup. For example, the two-step RA mask configuration can be transmitted to the UE in a downlink RRC message (e.g., RRCReconfiguration). If the mask for the corresponding logical channel is not setup, the UE may use transmit its BSR message to the base station through a scheduling request in action 1210.

Figure 13:
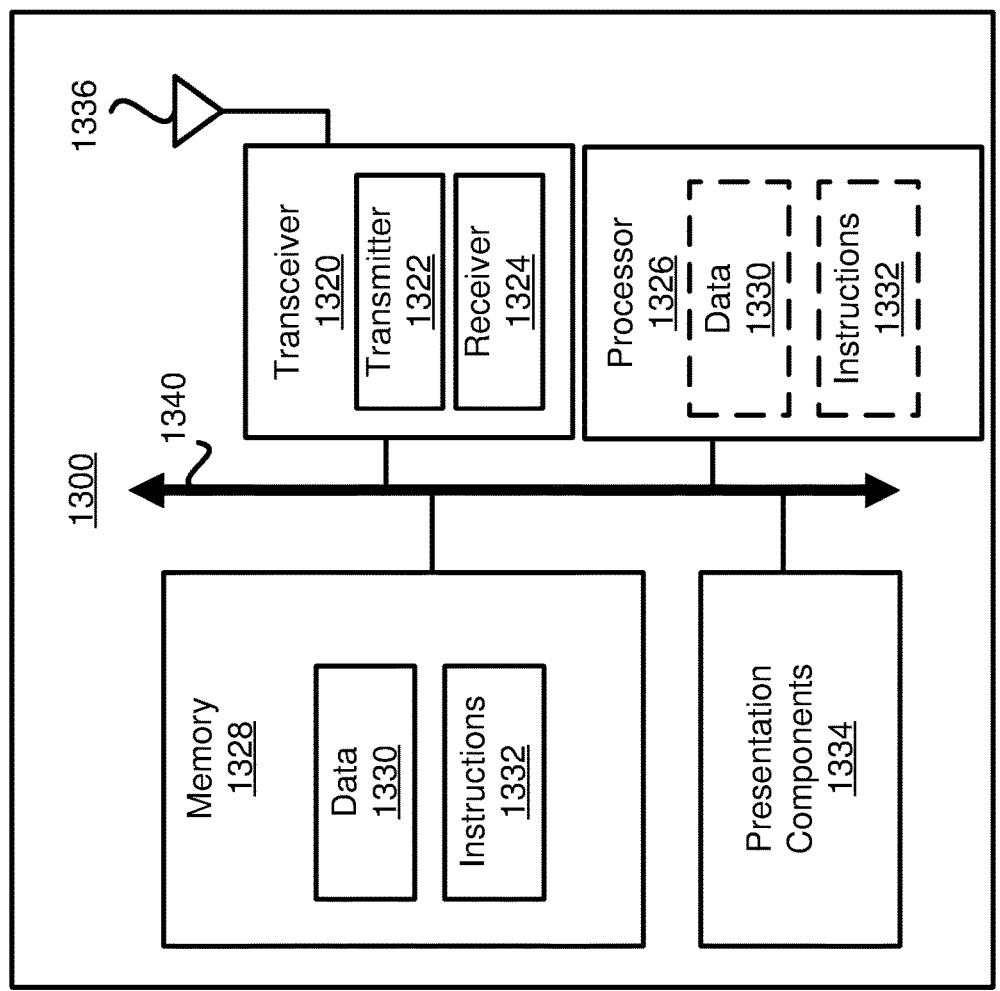
FIG. 13 is a block diagram illustrating a radio communication equipment, in accordance with an exemplary implementation of the present application.

FIG. 13 illustrates a block diagram of a node for wireless communication, in accordance with various aspects of the present application. As shown in FIG. 13, a node 1300 may include a transceiver 1320, a processor 1326, a memory 1328, one or more presentation components 1334, and at least one antenna 1336. The node 1300 may also include an RF spectrum band module, a base station communications module, a network communications module, and a system communications management module, input/output (I/O) ports, I/O components, and power supply (not explicitly shown in FIG. 13). Each of these components may be in communication with each other, directly or indirectly, over one or more buses 1340. In one implementation, the node 1300 may be a UE or a base station that performs various functions described herein, for example, with reference to FIGS. 1 through 12.

The transceiver 1320 having a transmitter 1322 and a receiver 1324 may be configured to transmit and/or receive time and/or frequency resource partitioning information. In some implementations, the transceiver 1320 may be configured to transmit in different types of subframes and slots including, but not limited to, usable, non-usable and flexibly usable subframes and slot formats. The transceiver 1320 may be configured to receive data and control channels.

The node 1300 may include a variety of computer-readable media. Computer-readable media can be any available media that can be accessed by the node 1300 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1328 may include computer-storage media in the form of volatile and/or non-volatile memory. The memory 1328 may be removable, non-removable, or a combination thereof. Exemplary memory includes solid-state memory, hard drives, optical-disc drives, and etc. As illustrated in FIG. 13, The memory 1328 may store computer-readable, computer-executable instructions 1332 (e.g., software codes) that are configured to, when executed, cause the processor 1326 to perform various functions described herein, for example, with reference to FIGS. 1 through 12. Alternatively, the instructions 1332 may not be directly executable by the processor 1326 but be configured to cause the node 1300 (e.g., when compiled and executed) to perform various functions described herein.

The processor 1326 may include an intelligent hardware device, e.g., a central processing unit (CPU), a microcontroller, an ASIC, and etc. The processor 1326 may include memory. The processor 1326 may process the data 1330 and the instructions 1332 received from the memory 1328, and information through the transceiver 1320, the base band communications module, and/or the network communications module. The processor 1326 may also process information to be sent to the transceiver 1320 for transmission through the antenna 1336, to the network communications module for transmission to a core network.

One or more presentation components 1334 presents data indications to a person or other device. Exemplary presentation components 1334 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) comprising:
one or more non-transitory computer-readable media having computer-executable instructions embodied thereon;
at least one processor coupled to the one or more non-transitory computer-readable media, and configured to execute the computer-executable instructions to:
receive a logical channel group (LCG) list having a plurality of logical channels in one or more LCGs, wherein grouping of the plurality of logical channels is based at least in part on a mapping policy between each of the plurality of logical channels and one or more numerology factors;
trigger a buffer status report (BSR) for a logical channel for requesting a numerology-specific uplink radio resource, wherein the BSR includes an LCG ID identifying the one of the one or more LCGs;

determine whether a two-step random access (RA) mask for the logical channel is set up, when an uplink resource is not granted after the BSR is triggered;

request for the numerology-specific uplink radio resource through a scheduling request (SR) after the BSR is triggered and when the two-step RA mask for the logical channel is not set up;

initiate a two-step RA procedure and transmit the BSR on an uplink resource associated with a preamble transmission of the two-step RA procedure after the BSR is triggered and when the two-step RA mask for the logical channel is set up;

wherein the LCG list is provided to the UE through a downlink radio resource control (RRC) message;

wherein the downlink RRC message includes an information element (IE) having a media access control (MAC) layer logical channel configuration for each of the plurality of logical channels.

2. The UE of claim 1, wherein the one or more numerology factors include transmission time interval (TTI) length, subcarrier spacing (SCS), and cyclic prefix (CP) length.

3. The UE of claim 1, wherein the BSR includes a numerology indictor indicating whether the BSR is requesting a default numerology resource or not.

4. The UE of claim 1, wherein the UE provides assisting information or a default numerology preference for each of the one or more LCGs.

5. The UE of claim 1, wherein the UE is pre-configured with a default numerology, and when the UE reports the BSR to the base station, a flag bit is applied by the UE to indicate whether the numerology of the requested uplink resource is limited to the default numerology or not.

6. The UE of claim 1, wherein the UE is pre-configured with a default numerology, and when the UE reports the BSR to the base station, a flag bit is placed within a short BSR control element (CE) or a truncated BSR CE.

7. The UE of claim 1, wherein the UE is pre-configured with a default numerology, and when the UE reports the BSR to the base station, a flag bit is placed within a long BSR control element (CE).

8. A base station comprising:
one or more non-transitory computer-readable media having computer-executable instructions embodied thereon;
at least one processor coupled to the one or more non-transitory computer-readable media, and configured to execute the computer-executable instructions to:
group a plurality of logical channels into one or more logical channel groups (LCGs) based at least in part on a mapping policy between each of the plurality of logical channels and one or more numerology factors;
provide an LCG list to a user equipment (UE), the LCG list having the plurality of logical channels in the one or more LCGs;
receive a scheduling request (SR), from the UE, for a numerology-specific uplink radio resource after a buffer status report (BSR) for a logical channel for requesting the numerology-specific uplink radio resource is triggered, when an uplink resource is not granted after the BSR is triggered, and when a two-step random access (RA) mask for the logical channel is not set up, wherein the BSR includes an LCG ID identifying the one of the one or more LCGs;
receive the BSR on an uplink resource associated with a preamble transmission of a two-step random access (RA) procedure after the BSR is triggered and when the two-step RA mask for the logical channel is set up;
wherein the LCG list is provided to the UE through a downlink radio resource control (RRC) message;
wherein the downlink RRC message includes an information element (IE) having a media access control (MAC) layer logical channel configuration for each of the plurality of logical channels.

9. The base station of claim 8, wherein the one or more numerology factors include transmission time interval (TTI) length, subcarrier spacing (SCS), and cyclic prefix (CP) length.

10. The base station of claim 8, wherein the BSR includes a numerology indictor indicating whether the BSR is requesting a default numerology resource or not.

* * * * *